United States Patent
Kim et al.

(10) Patent No.: US 9,425,863 B2
(45) Date of Patent: Aug. 23, 2016

(54) APPARATUS AND METHOD FOR WIRELESSLY RECEIVING POWER, AND APPARATUS AND METHOD FOR WIRELESSLY TRANSMITTING POWER

(71) Applicant: SAMSUNG ELECTRONICS CO., LTD., Suwon-si (KR)

(72) Inventors: Dong Zo Kim, Yongin-si (KR); Sang Wook Kwon, Seongnam-si (KR); Ki Young Kim, Yongin-si (KR); Nam Yun Kim, Seoul (KR); Yun Kwon Park, Dongducheon-si (KR); Jae Hyun Park, Pyeongtaek-si (KR); Keum Su Song, Seoul (KR); Chi Hyung Ahn, Suwon-si (KR); Young Ho Ryu, Yongin-si (KR); Chang Wook Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 657 days.

(21) Appl. No.: 13/874,602

(22) Filed: May 1, 2013

(65) Prior Publication Data
US 2013/0300206 A1 Nov. 14, 2013

(30) Foreign Application Priority Data
May 9, 2012 (KR) .................. 10-2012-0049177

(51) Int. Cl.
*H01F 27/42* (2006.01)
*H04B 5/00* (2006.01)
(52) U.S. Cl.
CPC .................. *H04B 5/0037* (2013.01)

(58) Field of Classification Search
CPC .................................................. H04B 5/0037
See application file for complete search history.

(56) References Cited

U.S. PATENT DOCUMENTS

| 7,912,163 | B2 | 3/2011 | Kawai | |
|---|---|---|---|---|
| 2009/0026844 | A1* | 1/2009 | Iisaka | H02J 7/025 307/104 |
| 2009/0302800 | A1* | 12/2009 | Shiozaki | H02J 7/025 320/108 |
| 2010/0213895 | A1 | 8/2010 | Keating et al. | |
| 2010/0217553 | A1 | 8/2010 | Von Novak et al. | |
| 2011/0127951 | A1 | 6/2011 | Walley et al. | |
| 2011/0127952 | A1 | 6/2011 | Walley et al. | |
| 2011/0127953 | A1 | 6/2011 | Walley et al. | |

FOREIGN PATENT DOCUMENTS

| EP | 1 241 767 A1 | 9/2002 |
|---|---|---|
| JP | 2000-197275 A | 7/2000 |

(Continued)

OTHER PUBLICATIONS

International Search Report issued Aug. 27, 2013 in counterpart International Application No. PCT/KR2013/003705 (3 pages, in English).

*Primary Examiner* — Daniel Cavallari
(74) *Attorney, Agent, or Firm* — NSIP Law

(57) ABSTRACT

An apparatus and a method for wirelessly receiving power, and an apparatus and a method for wirelessly transmitting power, are provided. A wireless power receiver includes a receiving unit configured to wirelessly receive a power, and a controller configured to control a length of a clock signal based on the power. The wireless power receiver further includes a modulator configured to change an impedance based on the length of the clock signal to perform load modulation.

11 Claims, 35 Drawing Sheets

(56) References Cited

FOREIGN PATENT DOCUMENTS

| JP | 2011-216130 A | 10/2011 |
|----|---------------|---------|
| KR | 10-2006-0031526 | 4/2006 |
| KR | 10-2008-0032519 | 4/2008 |
| KR | 10-2008-0053808 | 6/2008 |
| WO | WO 2010/035546 A1 | 4/2010 |

* cited by examiner

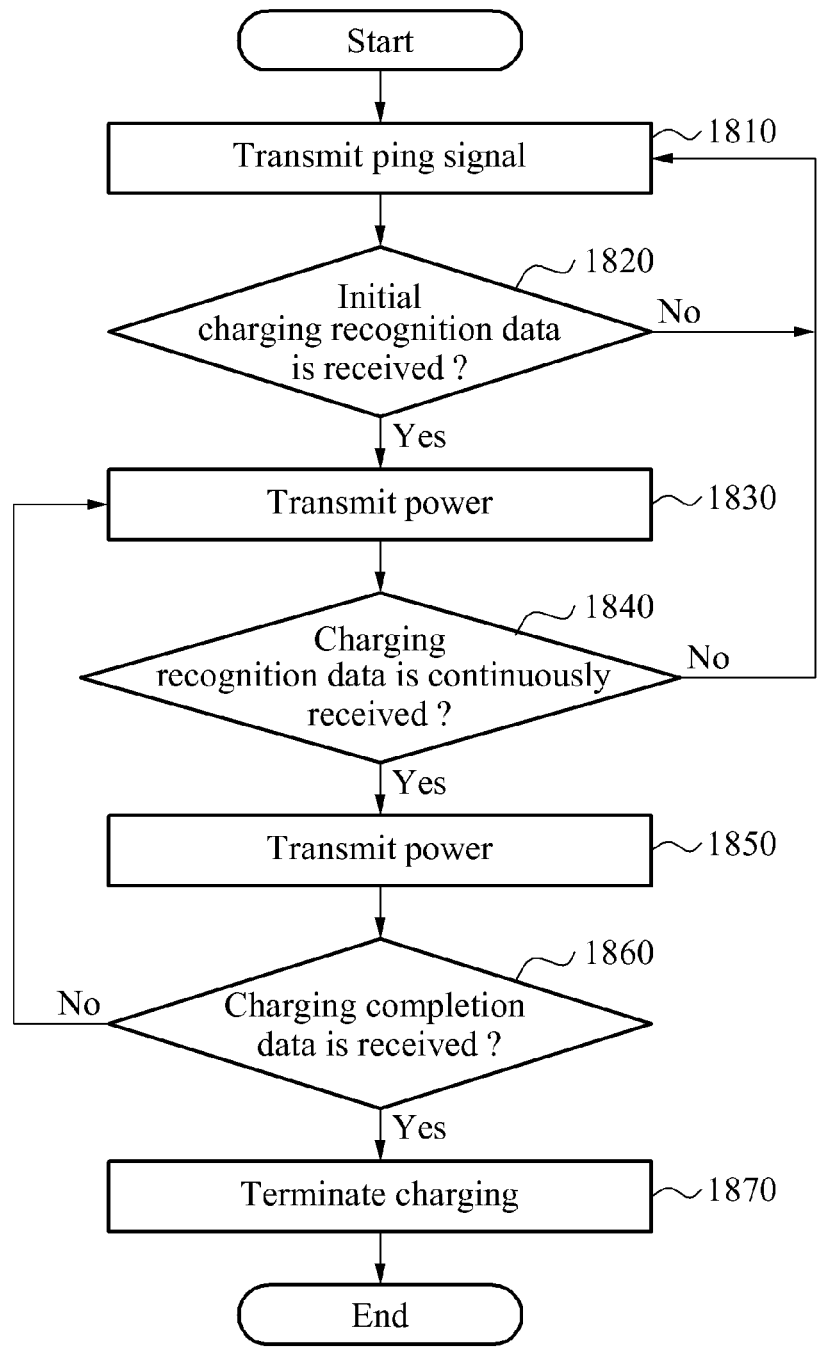

APPARATUS AND METHOD FOR WIRELESSLY RECEIVING POWER, AND APPARATUS AND METHOD FOR WIRELESSLY TRANSMITTING POWER

CROSS-REFERENCE TO RELATED APPLICATION(S)

This application claims the benefit under 35 U.S.C. §119 (a) of Korean Patent Application No. 10-2012-0049177, filed on May 9, 2012, in the Korean Intellectual Property Office, the entire disclosure of which is incorporated herein by reference for all purposes.

BACKGROUND

1. Field

The following description relates to an apparatus and a method for wirelessly receiving power, and an apparatus and a method for wirelessly transmitting power.

2. Description of Related Art

Research on wireless power transmission has been started to overcome an increase in inconveniences of wired power supplies, and the limited capacity of conventional batteries, due to an explosive increase in various electronic devices including electric vehicles, mobile devices, and the like. One of wireless power transmission technologies uses resonance characteristics of radio frequency (RF) devices. For example, a wireless power transmission system using resonance characteristics may include a source device configured to supply a power, and a target device configured to receive the supplied power.

SUMMARY

In one general aspect, there is provided a wireless power receiver including a receiving unit configured to wirelessly receive a power, and a controller configured to control a length of a clock signal based on the power. The wireless power receiver further includes a modulator configured to change an impedance based on the length of the clock signal to perform load modulation.

In another general aspect, there is provided a wireless power transmitter including a transmitting unit configured to wirelessly transmit a power via a signal, and a demodulator configured to demodulate a message from the signal that is modulated by load modulation in a wireless power receiver, based on a change in a waveform of the signal. The wireless power transmitter further includes a controller configured to control the transmitter to wirelessly transmit the power to the wireless power receiver based on the demodulated message.

In still another general aspect, there is provided a wireless power reception method including wirelessly receiving a power, and controlling a length of a clock signal based on the power. The wireless power reception method further includes changing an impedance based on the length of the clock signal to perform load modulation.

In yet another general aspect, there is provided a wireless power transmission method including wirelessly transmitting a power via a signal, and demodulating a message from the signal that is modulated by load modulation in a wireless power receiver, based on a change in a waveform of the signal. The wireless power transmission method further includes controlling the wireless transmission of the power to the wireless power receiver based on the demodulated message.

Other features and aspects will be apparent from the following detailed description, the drawings, and the claims.

BRIEF DESCRIPTION OF THE DRAWINGS

FIG. 18 is a flowchart illustrating an example of a wireless power transmission method.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

A scheme of performing communication between a source and a target may include an in-band communication scheme, and an out-band communication scheme. The in-band communication scheme means communication performed between the source and the target in the same frequency band as used for power transmission. The out-band communication scheme means communication performed between the source and the target in a separate frequency band, than used for power transmission.

Figure 1:
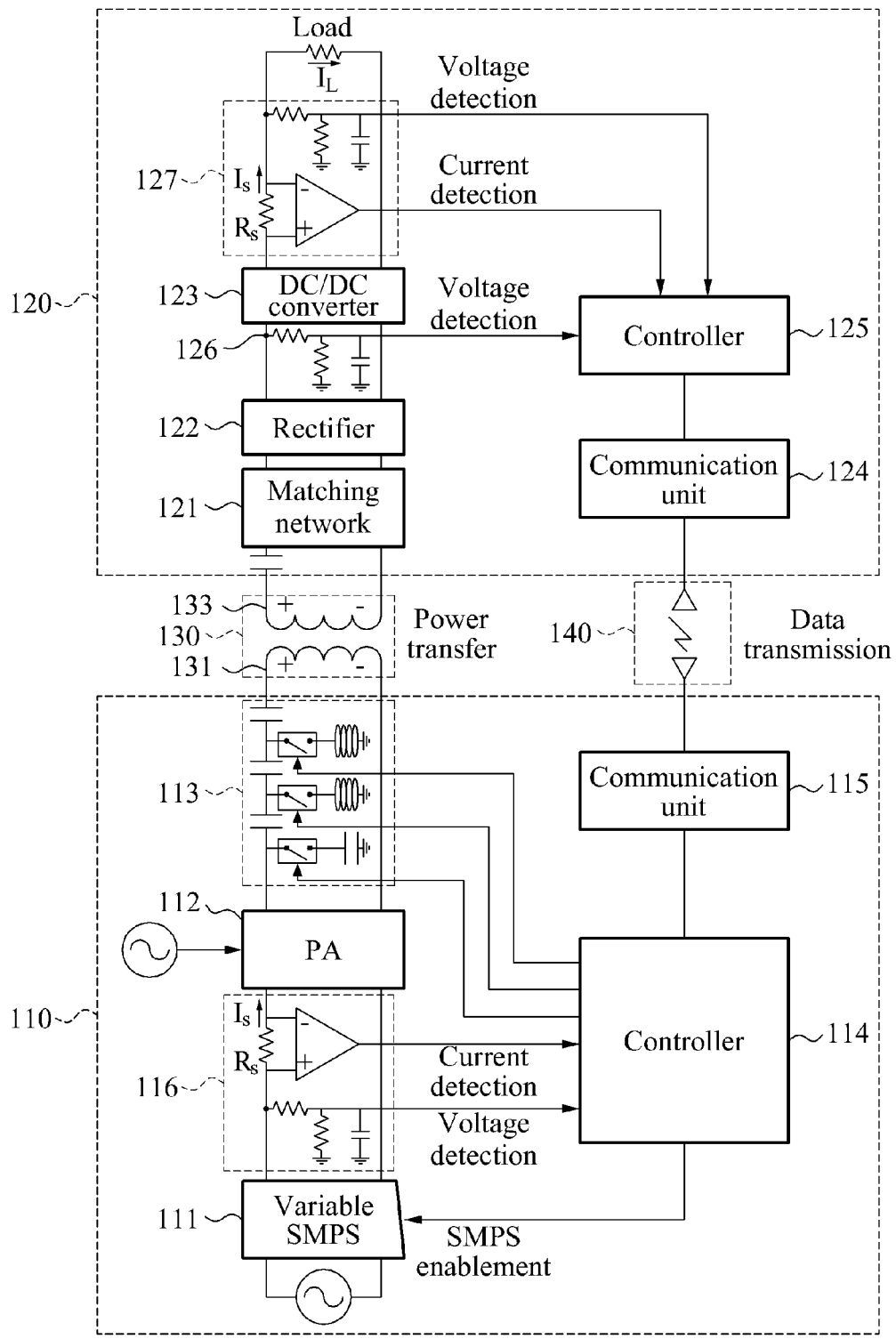
FIG. 1 is a diagram illustrating an example of a wireless power transmission system.

FIG. 1 is a diagram illustrating an example of a wireless power transmission system. Referring to FIG. 1, the wireless power transmission system includes a source device 110 and a target device 120. The source device 110 is a device supplying wireless power, and may be any of various devices that supply power, such as pads, terminals, televisions (TVs), and any other device that supplies power. The target device 120 is a device receiving wireless power, and may be any of various devices that consume power, such as terminals, TVs, vehicles, washing machines, radios, lighting systems, and any other device that consumes power.

The source device 110 includes a variable switching mode power supply (SMPS) 111, a power amplifier 112, a matching network 113, a controller 114, a communication unit 115, a power detector 116, and a source resonator 131. The target device 120 includes a matching network 121, a rectifier 122, a direct current-to-direct current (DC/DC) converter 123, a communication unit 124, a controller 125, a power detector 127, and a target resonator 133.

The variable SMPS 111 generates a DC voltage by switching an alternating current (AC) voltage having a frequency of tens of hertz (Hz) output from a power supply. The variable SMPS 111 may output a DC voltage having a predetermined level, or may output a DC voltage having an adjustable level by the controller 114.

The variable SMPS 111 may control the DC voltage based on a level of power output from the power amplifier 112 so that the power amplifier 112 may operate in a saturation region with high efficiency at all times, and may enable a maximum efficiency to be maintained at all levels of the output power. The power amplifier 112 may include class-E features.

For example, when a common SMPS is used instead of the variable SMPS 111, a variable DC/DC converter may need to be additionally used. In this example, the common SMPS and the variable DC/DC converter may control the DC voltage based on the level of the power output from the power amplifier 112 so that the power amplifier 112 may operate in the saturation region with high efficiency at all times, and may enable the maximum efficiency to be maintained at all levels of the output power.

The power detector 116 detects an output current and an output voltage of the variable SMPS 111, and provides, to the controller 114, information on the detected current and the detected voltage. Additionally, the power detector 116 detects an input current and an input voltage of the power amplifier 112.

The power amplifier 112 generates a power by converting the DC voltage output from the variable SMPS 111 to an AC voltage using a switching pulse signal having a frequency of a few kilohertz (kHz) to tens of megahertz (MHz). In other words, the power amplifier 112 converts a DC voltage supplied to a power amplifier to an AC voltage using a reference resonance frequency $F_{Ref}$, and generates a communication power to be used for communication, or a charging power to be used for charging that may be used in a plurality of target devices. The communication power may be, for example, a low power of 0.1 to 1 milliwatts (mW) that may be used by a target device to perform communication, and the charging power may be, for example, a high power of 1 mW to 200 Watts (W) that may be consumed by a device load of a target device. In this description, the term "charging" may refer to supplying power to an element or a unit that charges a battery or other rechargeable device with power. Also, the term "charging" may refer supplying power to an element or a unit that consumes power. For example, the term "charging power" may refer to power consumed by a target device while operating, or power used to charge a battery of the target device. The unit or the element may include, for example, a battery, a display device, a sound output circuit, a main processor, and various types of sensors.

In this description, the term "reference resonance frequency" refers to a resonance frequency that is nominally used by the source device 110, and the term "tracking frequency" refers to a resonance frequency used by the source device 110 that has been adjusted based on a predetermined scheme.

The controller 114 may detect a reflected wave of the communication power or a reflected wave of the charging power, and may detect mismatching between the target resonator 133 and the source resonator 131 based on the detected reflected wave. The controller 114 may detect the mismatching by detecting an envelope of the reflected wave, or by detecting an amount of a power of the reflected wave.

Under the control of the controller 114, the matching network 113 compensates for impedance mismatching between the source resonator 131 and the target resonator 133 so that the source resonator 131 and the target resonator 133 are optimally-matched. The matching network 113 includes combinations of a capacitor and an inductor that are connected to the controller 114 through a switch, which is under the control of the controller 114.

The controller 114 may calculate a voltage standing wave ratio (VSWR) based on a voltage level of the reflected wave and a level of an output voltage of the source resonator 131 or the power amplifier 112. When the VSWR is greater than a predetermined value, the controller 114 detects the mismatching. In this example, the controller 114 calculates a power transmission efficiency of each of N predetermined tracking frequencies, determines a tracking frequency $F_{Best}$ having the best power transmission efficiency among the N predetermined tracking frequencies, and changes the reference resonance frequency $F_{Ref}$ to the tracking frequency $F_{Best}$.

Also, the controller 114 may control a frequency of the switching pulse signal used by the power amplifier 112. By controlling the switching pulse signal used by the power amplifier 112, the controller 114 may generate a modulation signal to be transmitted to the target device 120. In other words, the communication unit 115 may transmit various messages to the target device 120 via in-band communication. Additionally, the controller 114 may detect a reflected wave, and may demodulate a signal received from the target device 120 through an envelope of the reflected wave.

The controller 114 may generate a modulation signal for in-band communication using various schemes. To generate a modulation signal, the controller 114 may turn on or off the switching pulse signal used by the power amplifier 112, or may perform delta-sigma modulation. Additionally, the controller 114 may generate a pulse-width modulation (PWM) signal having a predetermined envelope.

The controller 114 determines an initial wireless power to be transmitted to the target device 120 based on a change in a temperature of the source device 110, a battery state of the target device 120, a change in an amount of a power received at the target device 120, and/or a change in a temperature of the target device 120. The source device 110 may further include a temperature measurement sensor (not illustrated) configured to detect the change in the temperature of the source device 110. The source device 110 may receive, from the target device 120, information on the battery state of the target device 120, the change in the amount of the power received at the target device 120, and/or the change in the temperature of the target device 120. The source device 110 may detect the change in the temperature of the target device 120 based on data received from the target device 120.

The controller 114 adjusts a voltage supplied to the PA 112 based on a lookup table. The lookup table may store an amount of the voltage to be adjusted based on the change in the temperature of the source device 110. For example, if the temperature of the source device 110 rises, the controller 114 may lower the voltage supplied to the PA 112.

The communication unit 115 may perform out-of-band communication using a communication channel. The communication unit 115 may include a communication module, such as a ZigBee module, a Bluetooth module, or any other communication module, that the communication unit 115 may use to perform the out-of-band communication. The communication unit 115 may transmit or receive data 140 to or from the target device 120 via the out-of-band communication.

The source resonator 131 transfers electromagnetic energy 130, such as the communication power or the charging power, to the target resonator 133 via a magnetic coupling with the target resonator 133.

The target resonator 133 receives the electromagnetic energy 130, such as the communication power or the charging power, from the source resonator 131 via a magnetic coupling with the source resonator 131. Additionally, the target resonator 133 receives various messages from the source device 110 via the in-band communication.

The target resonator 133 receives, from the source device 110, the initial wireless power determined based on the change in the temperature of the source device 110, the battery state of the target device 120, the change in the amount of the power received at the target device 120, and/or the change in the temperature of the target device 120.

The matching network 121 matches an input impedance viewed from the source device 110 to an output impedance viewed from a load. The matching network 121 may be configured with a combination of a capacitor and an inductor.

The rectifier 122 generates a DC voltage by rectifying an AC voltage received by the target resonator 133.

The DC/DC converter 123 adjusts a level of the DC voltage output from the rectifier 122 based on a voltage rating of the load. For example, the DC/DC converter 123 may adjust the level of the DC voltage output from the rectifier 122 to a level in a range from 3 volts (V) to 10 V.

The power detector 127 detects a voltage (e.g., $V_{dd}$) of an input terminal 126 of the DC/DC converter 123, and a current and a voltage of an output terminal of the DC/DC converter 123. The power detector 127 outputs the detected voltage of the input terminal 126, and the detected current and the detected voltage of the output terminal, to the controller 125. The controller 125 uses the detected voltage of the input terminal 126 to compute a transmission efficiency of power received from the source device 110. Additionally, the controller 125 uses the detected current and the detected voltage of the output terminal to compute an amount of power transferred to the load. The controller 114 of the source device 110 determines an amount of power that needs to be transmitted by the source device 110 based on an amount of power required by the load and the amount of power transferred to the load. When the communication unit 124 transfers an amount of power of the output terminal (e.g., the computed amount of power transferred to the load) to the source device 110, the controller 114 of the source device 110 may compute the amount of power that needs to be transmitted by the source device 110.

The communication unit 124 may perform in-band communication for transmitting or receiving data using a resonance frequency by demodulating a received signal obtained by detecting a signal between the target resonator 133 and the rectifier 122, or by detecting an output signal of the rectifier 122. In other words, the controller 125 may demodulate a message received via the in-band communication.

Additionally, the controller 125 may adjust an impedance of the target resonator 133 to modulate a signal to be transmitted to the source device 110. For example, the controller 125 may increase the impedance of the target resonator so that a reflected wave will be detected by the controller 114 of the source device 110. In this example, depending on whether the reflected wave is detected, the controller 114 of the source device 110 will detect a binary number "0" or "1".

The communication unit 124 may transmit, to the source device 110, any one or any combination of a response message including a product type of a corresponding target device, manufacturer information of the corresponding target device, a product model name of the corresponding target device, a battery type of the corresponding target device, a charging scheme of the corresponding target device, an impedance value of a load of the corresponding target device, information about a characteristic of a target resonator of the corresponding target device, information about a frequency band used the corresponding target device, an amount of power to be used by the corresponding target device, an intrinsic identifier of the corresponding target device, product version information of the corresponding target device, and standards information of the corresponding target device.

The communication unit 124 may also perform an out-of-band communication using a communication channel. The communication unit 124 may include a communication module, such as a ZigBee module, a Bluetooth module, or any other communication module known in the art, that the communication unit 124 may use to transmit or receive data 140 to or from the source device 110 via the out-of-band communication.

The communication unit 124 may receive a wake-up request message from the source device 110, detect an amount of a power received by the target resonator, and transmit, to the source device 110, information about the amount of the power received by the target resonator. In this example, the information about the amount of the power received by the target resonator may correspond to an input voltage value and an input current value of the rectifier 122, an output voltage value and an output current value of the rectifier 122, or an output voltage value and an output current value of the DC/DC converter 123.

Figure 2:
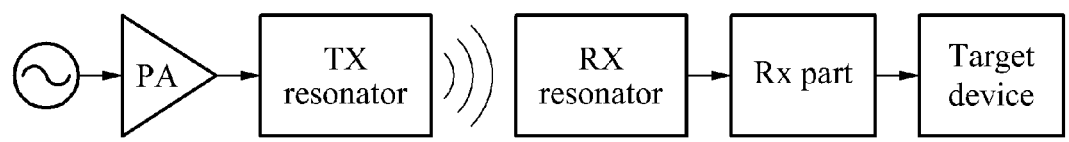
FIG. 2 is a block diagram illustrating an example of a wireless power transmission system.

FIG. 2 is a block diagram illustrating an example of a wireless power transmission system. Referring to FIG. 2, the wireless power transmission system includes a transmitting (TX) end and a receiving (RX) end.

The TX end includes a power supply, a PA, and a TX resonator. The RX end includes an RX resonator, an RX part, and a target device.

The PA receives an AC voltage in a band of tens of Hz from the power supply. The PA amplifies the AC voltage to a resonant frequency band between the TX resonator and the RX resonator, and a level of a power required by the target device, to generate a power to be transmitted to the RX end.

The TX resonator wirelessly transmits, to the RX resonator, the power in the resonant frequency band through mutual resonance with the RX resonator.

The RX resonator wirelessly receives the power from the TX resonator.

The RX part rectifies an AC signal of the power to a DC signal, and converts the DC signal into a rated voltage required by the target device. That is, the RX part converts the power received via the RX resonator to a form and a value required by the target device.

The target device may refer to a load that is physically connected to the RX part. The target device may include, for example, a battery that stores a predetermined amount of a power, a terminal, a tablet PC, a medical device, an electric vehicle, a pad that is operated by receiving a power in real time, and/or other devices known to one of ordinary skill in the art.

Figure 3:
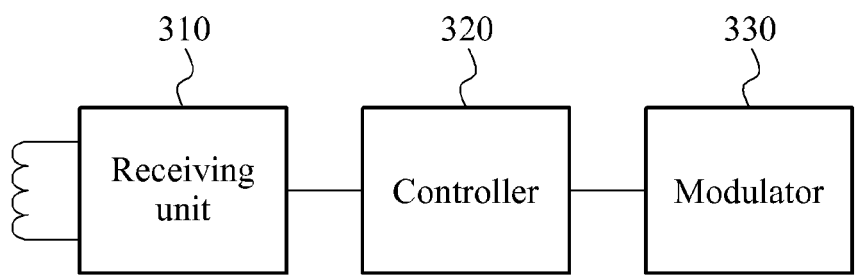
FIG. 3 is a block diagram illustrating an example of a wireless power receiver.

FIG. 3 is a block diagram illustrating an example of a wireless power receiver. Referring to FIG. 3, the wireless power receiver includes a receiving unit 310, a controller 320, and a modulator 330.

The receiving unit 310 (e.g., a receiver) wirelessly receives a power from a wireless power transmitter through mutual resonance between a source resonator of the wireless power transmitter and a target resonator of the wireless power receiver, e.g., of the receiving unit 310. The power is in a resonant frequency band in which the mutual resonance is performed between the source resonator and the target resonator.

The controller 320 controls a length of a clock signal based on a voltage applied to a load of the wireless power receiver that is charged with the received power. In more detail, by charging the load with the received power, the voltage applied to the load may be changed. The controller 320 determines a charging state of the load based on the voltage applied to the load. The controller 320 controls the length of the clock signal based on the charging state of the load. The clock signal may include a pulse wave including a predetermined frequency, for example, 100 kilohertz (KHz) or 150 KHz. The length of the clock signal may include a length of time in which the clock signal of the predetermined frequency is maintained.

In a first charging state of the load, when the load is to be charged, the controller 320 outputs, to the modulator 330, clock signals during a predetermined period. In this example, the controller 320 may adjust a number of the clock signals within the predetermined period. For example, the controller 320 may output eight clock signals within the predetermined period. The eight clock signals output from the controller 320 may indicate that the load is to be charged. The wireless power transmitter and the wireless power receiver may determine that the eight clock signals correspond to a message stating that the load is to be charged. Additionally, the eight clock signals output from the controller 320 may indicate that the load is being charged. The wireless power transmitter and the wireless power receiver may determine that the eight clock signals correspond to a message stating that the load is being charged.

In another charging state of the load, when the charging of the load is completed, the controller 320 continuously outputs the clock signals to the modulator 330. In this example, the controller 320 continuously outputs the clock signals, regardless of the number of the clock signals. That is, the number of the clock signals output from the controller 320 may be less than or greater than the number of the clock signals output from the controller 320 when the load is to be charged and/or is being charged.

The modulator 330 may change an impedance of the wireless power receiver based on the length of the clock signal, and performs load modulation. The load modulation includes a modulation scheme of mapping information to a variation of the load. The variation of the load corresponds to the change of the impedance. The modulator 330 may change the impedance based on the number of the clock signals. When the clock signal is used, the modulator 330 may increase or decrease the impedance, compared to if the clock signal is not used. When the impedance is increased or decreased, a waveform of a radio frequency (RF) signal of the power transmitted by the wireless power transmitter is changed. When the wireless power transmitter detects the change in the waveform of the RF signal, the wireless power transmitter interprets the information mapped to the detected change based on a rule that is agreed in advance between the wireless power receiver and the wireless power transmitter.

In an example, the modulator 330 may change the impedance of the wireless power receiver based on the number of the clock signals that are output from the controller 320 during each predetermined period. In this example, the number of the clock signals may be set in advance. Additionally, a message stating that the wireless power receiver requests the load to be charged may be mapped to the changed impedance. In addition, a message stating that the load is being charged may be mapped to the changed impedance.

In another example, the modulator 330 may change the impedance of the wireless power receiver based on the clock signals that are continuously output from the controller 320. In this example, a message stating that the charging of the load is completed is mapped to the changed impedance.

The modulator 330 may include a transistor. The transistor may function as a switch. The transistor may include, for example, an n-channel metal-oxide-semiconductor (NMOS) transistor or a p-channel metal-oxide-semiconductor (PMOS) transistor. The modulator 330 may change the impedance of the wireless power receiver based on the length of the clock signal applied to a gate of the transistor.

In an example, if the clock signal is applied to the gate, the transistor may be powered on, and the impedance of the wireless power receiver may be reduced, compared to if the clock signal is not applied. In another example, if a predetermined number of the clock signals are applied to the gate, the transistor may be powered on, and the impedance of the wireless power receiver may be reduced.

The controller 320 may control an overall operation of the wireless power receiver, and may perform functions of the receiving unit 310 and functions of the modulator 330. To individually describe functions of the receiving unit 310, the controller 320, and the modulator 330, the receiving unit 310, the controller 320, and the modulator 330 are separately illustrated in FIG. 3. However, when the wireless power receiver is implemented, the controller 320 may perform all of the functions, or only a portion of the functions.

Figure 4:
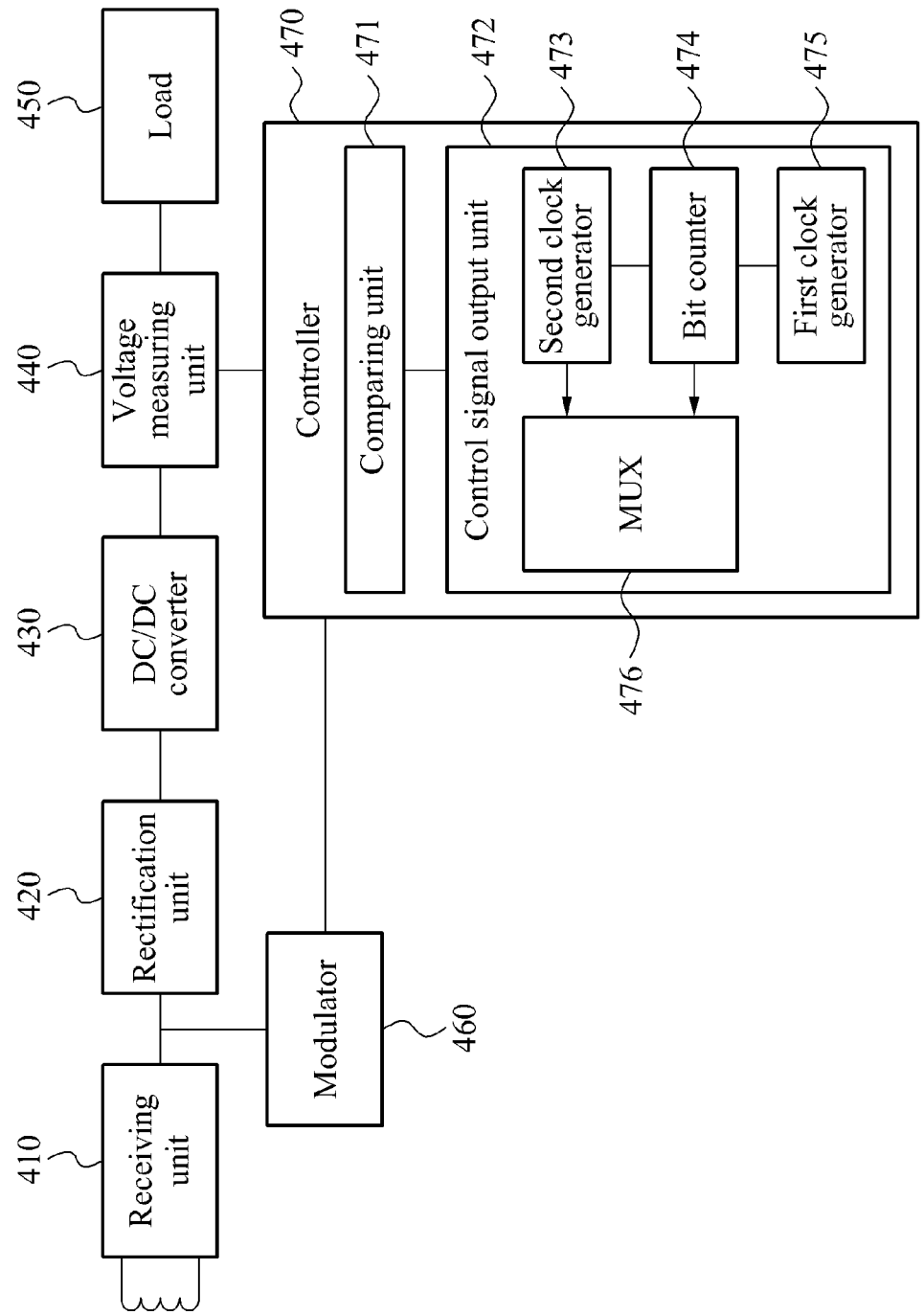
FIG. 4 is a block diagram illustrating another example of a wireless power receiver.

FIG. 4 is a block diagram illustrating another example of a wireless power receiver. Referring to FIG. 4, the wireless power receiver includes a receiving unit 410, a rectification unit 420, a DC/DC converter 430, a voltage measuring unit 440, a load 450, a modulator 460, and a controller 470.

The receiving unit 410 wirelessly receives a power from a wireless power transmitter through mutual resonance between a source resonator of the wireless power transmitter and a target resonator of the wireless power receiver, e.g., of the receiving unit 410. The power is in a resonant frequency band in which the mutual resonance is performed between the source resonator and the target resonator.

The rectification unit 420 rectifies an AC signal of the power received from the target resonator to a DC signal.

The DC/DC converter 430 converts a voltage of the DC signal output from the rectification unit 420 to a voltage required by and applied to the load 450. The load 450 may be included in or separated from the wireless power receiver. If the load 450 is a battery, a rated voltage of the battery may be determined based on a type of the battery. The DC/DC converter 430 may convert the voltage of the DC signal output from the rectification unit 420 based on the rated voltage.

The voltage measuring unit 440 measures the voltage applied to the load 450. As the load 450 is charged with the received power, the voltage applied to the load 450 may increase. The voltage measuring unit 440 may measure the voltage applied to the load 450 periodically or in real time. The voltage measuring unit 440 transmits, to the controller 470, a result (e.g., data) of the measurement of the voltage applied to the load 450.

The modulator 460 may change an impedance of the wireless power receiver based on a length of a clock signal output from the controller 470, and performs load modulation. The load modulation includes a modulation scheme of mapping information to a variation of the load 450. The variation of the load 450 corresponds to the change of the impedance. The modulator 460 may change the impedance based on a number of clock signals output from the controller 470. When the clock signal is used, the modulator 460 may increase or decrease the impedance, compared to if the clock signal is not used. When the impedance is increased or decreased, a waveform of an RF signal of the power transmitted by the wireless power transmitter is changed.

The controller 470 controls the length of the clock signal based on the voltage applied to the load 450. In more detail, by charging the load 450 with the received power, the voltage applied to the load 450 may be changed. The controller 470 determines a charging state of the load 450 based on the voltage applied to the load 450. The controller 470 controls the length of the clock signal based on the charging state of the load 450. The clock signal may include a pulse wave including a predetermined frequency, for example, 100 KHz or 150 KHz. The length of the clock signal may include a length of time in which the clock signal of the predetermined frequency is maintained.

The controller 470 includes a comparing unit 471 and a control signal output unit 472. The control signal output unit 472 includes a second clock generator 473, a bit counter 474, a first clock generator 475, and a multiplexer (MUX) 476.

The comparing unit 471 compares the voltage applied to the load 450 with a reference voltage, and outputs, to the control signal output unit 472, either a high signal or a low signal based on a result of the comparison. The high signal may include a digital signal '1', and the low signal may include a digital signal '0'.

In more detail, the reference voltage may be set to the same value as a value of a voltage measured when the load 450 is completely-charged. For example, if the load 450 is a battery, and a voltage of 4.2 V is measured after the battery is completely-charged, the reference voltage may be set to 4.2 V.

When the voltage applied to the load 450 is less than the reference voltage, the comparing unit 471 may output the low signal. When the voltage applied to the load 450 is greater than or equal to the reference voltage, the comparing unit 471 may output the high signal. In this example, when the control signal output unit 472 receives the high signal, the control signal output unit 472 may continuously output the clock signals to the modulator 460. When the control signal output unit 472 receives the low signal, the control signal output unit 472 may output the clock signals during a predetermined period to the modulator 460. In this example, the number of the clock signals output during the predetermined period may be set in advance between the wireless power receiver and the wireless power transmitter.

When the voltage applied to the load 450 is less than the reference voltage, the comparing unit 471 may output the high signal. When the voltage applied to the load 450 is greater than or equal to the reference voltage, the comparing unit 471 may output the low signal. In this example, when the control signal output unit 472 receives the low signal, the control signal output unit 472 may continuously output the clock signals to the modulator 460. When the control signal output unit 472 receives the high signal, the control signal output unit 472 may output the clock signals during a predetermined period to the modulator 460. In this example, the number of the clock signals output during the predetermined period may be set in advance between the wireless power receiver and the wireless power transmitter.

The second clock generator 473 continuously generates and outputs second clock signals of a predetermined frequency, for example, 100 KHz or 150 KHz.

The first clock generator 475 generates and outputs, to the bit counter 474, a first clock signal during a predetermined period, for example, 0.1 second. A frequency of the first clock signal may be set to 10 Hz.

The bit counter 474 receives the second clock signals and the first clock signal from the second clock generator 473 and the first clock generator 475, respectively. When the bit counter 474 receives the first clock signal, the bit counter 474 counts, using bits, the second clock signals, and outputs, to the MUX 476, the counted second clock signals during the predetermined period of the first clock signal and among the second clock signals received from the second clock generator 473. In this example, a number of the counted second clock signals may be set in advance between the wireless power receiver and the wireless power transmitter.

That is, the bit counter 474 may not output a number of the second clock signals that is greater than the set number of the second clock signals. A message stating that the wireless power receiver requests the load 450 to be charged, and/or a message stating that the load 450 is being charged, may be mapped to the impedance changed based on the number of the second clock signals.

The MUX 476 receives the second clock signals from the second clock generator 473, and the counted second clock signals from the bit counter 474. When the MUX 476 receives the high signal from the comparing unit 471, the MUX 476 may continuously output the second clock signals received from the second clock generator 473 as the clock signals continuously output from the control signal output unit 472. A message stating that the charging of the load 450 is completed is mapped to the changed impedance based on the continuously output second clock signals. When the MUX 476 receives the low signal from the comparing unit 471, the MUX 476 outputs the counted second clock signals during the predetermined period that are received from the bit counter 474 as the clock signals output from the control signal output unit 472. In this example, the number of the second clock signals output in response to the low signal may be set in advance between the wireless power receiver and the wireless power transmitter.

The control signal output unit 472 may be charged by a minimum power needed to generate and output the clock signals, through a ping signal received from the wireless power transmitter. The power received by the receiving unit 410 may be transferred to the controller 470, and may be used to operate the second clock generator 473, the bit counter 474, the first clock generator 475, and the MUX 476.

Figure 5:
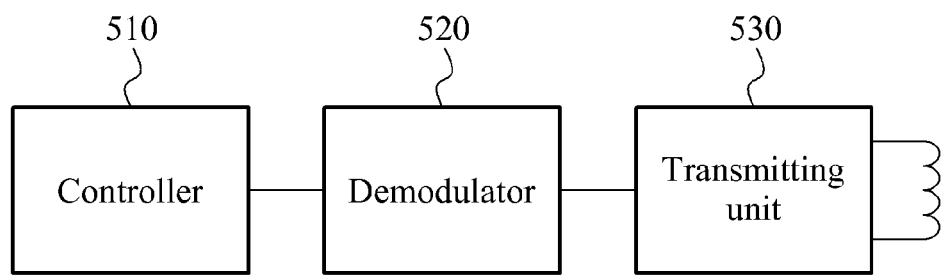
FIG. 5 is a block diagram illustrating an example of a wireless power transmitter.

FIG. 5 is a block diagram illustrating an example of a wireless power transmitter. Referring to FIG. 5, the wireless power transmitter includes a controller 510, a demodulator 520, and a transmitting unit 530.

The controller 510 determines whether a power is to be transmitted to a wireless power receiver based on a message received from the wireless power receiver and demodulated from a signal by the demodulator 520. The signal includes an RF signal of the power transmitted by the transmitting unit 530.

The demodulator 520 demodulates the message from the RF signal that is modulated by a load modulation scheme in the wireless power receiver, based on a change in a waveform of the RF signal. The load modulation scheme may include a scheme of modulating the signal based on whether an impedance of the wireless power receiver is changed, or based on a variation of the impedance. When the impedance is changed, the waveform of the RF signal is changed. Based on the change in the waveform of the RF signal, the demodulator 520 demodulates the message from the modulated signal. The message mapped to a type of the change in the waveform of the RF signal may be set in advance between the wireless power transmitter and the wireless power receiver. In other words, the message is transferred from the wireless power receiver to the wireless power transmitter via an in-band communication scheme that uses the same RF signal for data transmission and reception as for power transmission and reception.

The transmitting unit 530 (e.g., a transmitter) wirelessly transmits the power to the wireless power receiver through mutual resonance between a source resonator of the wireless power transmitter (e.g., the transmitting unit 530) and a target resonator of the wireless power receiver. The power is in a resonant frequency band in which the mutual resonance is performed between the source resonator and the target resonator. The power is also in the form of an AC signal, which is the RF signal.

The demodulator 520 may determine that clock signals are output in the wireless power receiver based on the change in the waveform of the RF signal. When the demodulator 520 determines that the clock signals are output, the demodulator 520 determines that the wireless power receiver is located within a charging area of the wireless power transmitter, and may interpret the change in the waveform of the RF signal as a message stating that the wireless power receiver is ready to be charged. In this example, a number of the output clock signals may be set in advance between the wireless power receiver and the wireless power transmitter. Additionally, the controller 510 may control the transmitting unit 530 to transmit the power.

Further, when the demodulator 520 determines that the clock signals are output, the demodulator 520 may interpret the change in the waveform of the RF signal as a message stating that the wireless power receiver is being charged. In this example, the controller 510 may control the transmitting unit 530 to continuously transmit the power.

The demodulator 520 may determine that the clock signals are continuously output in the wireless power receiver based on the change in the waveform of the RF signal. When the demodulator 520 determines that the clock signals are continuously output, the demodulator 520 may interpret the change in the waveform of the RF signal as a message stating that the wireless power receiver is completely-charged. In this example, the controller 510 may terminate operation of the transmitting unit 530.

The transmitting unit 530 may transmit a ping signal to the wireless power receiver. The ping signal may include a signal including a minimum power needed by the wireless power receiver to generate and output the clock signals.

Figure 6A:
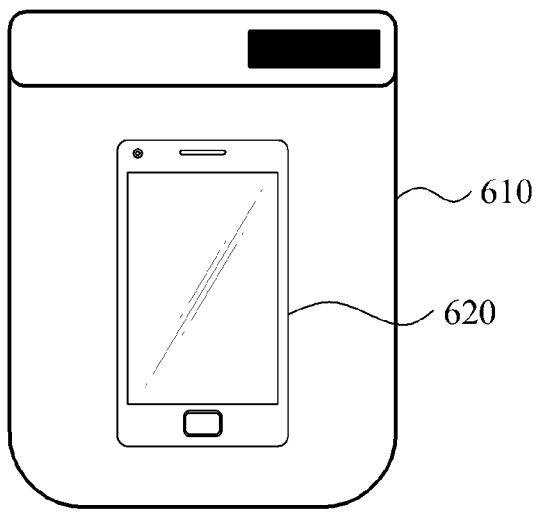
FIGS. 6A through 8B are diagrams illustrating examples of applications in which a wireless power receiver and a wireless power transmitter are mounted.

FIGS. 6A through 8B are diagrams illustrating examples of applications in which a wireless power receiver and a wireless power transmitter are mounted. FIG. 6A illustrates an example of wireless power charging between a pad 610 and a mobile terminal 620, and FIG. 6B illustrates an example of wireless power charging between pads 630 and 640 and hearing aids 650 and 660, respectively.

Referring to FIG. 6A, a wireless power transmitter is mounted in the pad 610, and a wireless power receiver is mounted in the mobile terminal 620. The pad 610 charges a single mobile terminal, namely, the mobile terminal 620.

Figure 6B:
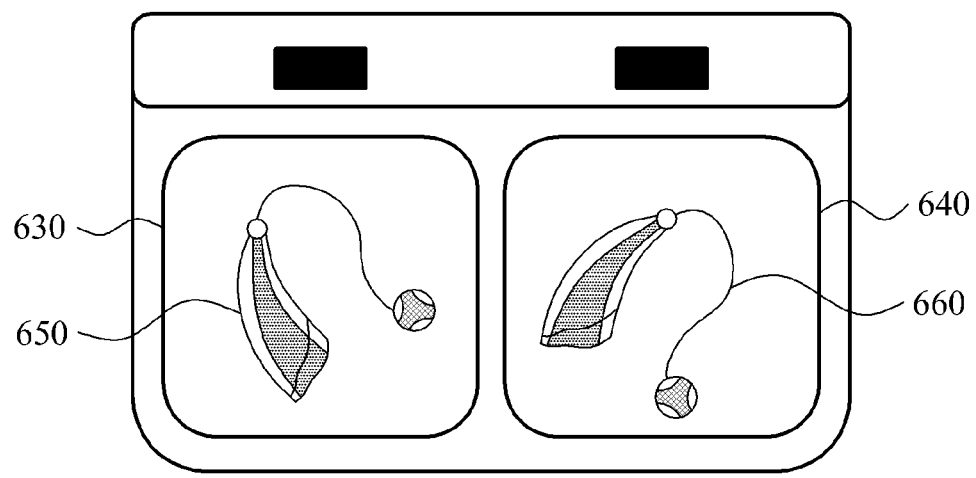

Referring to FIG. 6B, two wireless power transmitters are respectively mounted in the pads 630 and 640. The hearing aids 650 and 660 are used for a left ear and a right ear, respectively. Two wireless power receivers are respectively mounted in the hearing aids 650 and 660. The pads 630 and 640 charge two hearing aids, respectively, namely, the hearing aids 650 and 660.

Figure 7A:
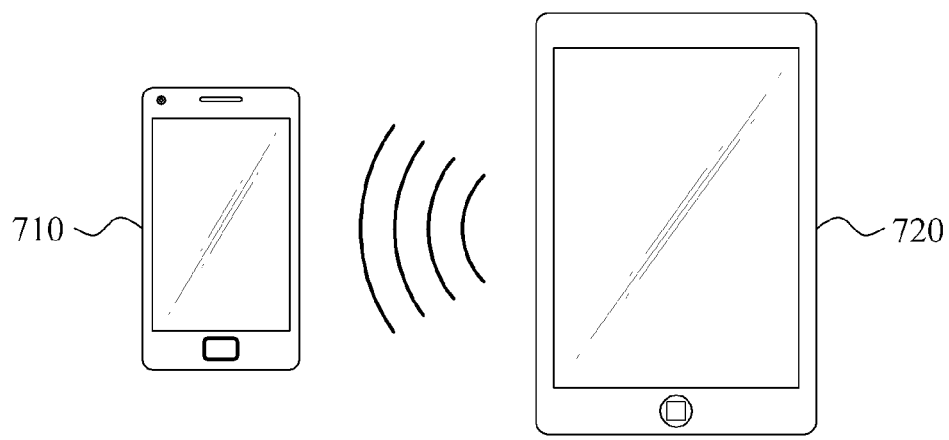
Figure 7B:
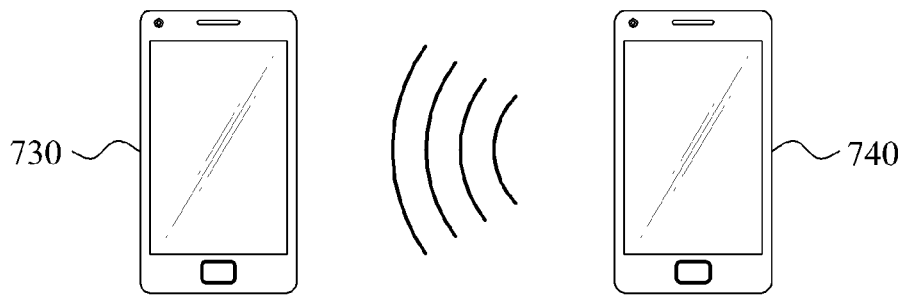

FIG. 7A illustrates an example of wireless power charging between a mobile terminal 710 and a tablet PC 720. FIG. 7B illustrates an example of wireless power charging between mobile terminals 730 and 740.

Referring to FIG. 7A, a wireless power transmitter and a wireless power receiver are mounted in the mobile terminal 710. Another wireless power transmitter and another wireless power receiver are mounted in the tablet PC 720. The mobile terminal 710 and the tablet PC 720 wirelessly exchange a power.

Referring to FIG. 7B, a wireless power transmitter and a wireless power receiver are mounted in the mobile terminal 730. Another wireless power transmitter and another wireless power receiver are mounted in the mobile terminal 740. The mobile terminals 730 and 740 wirelessly exchange a power.

Figure 8A:
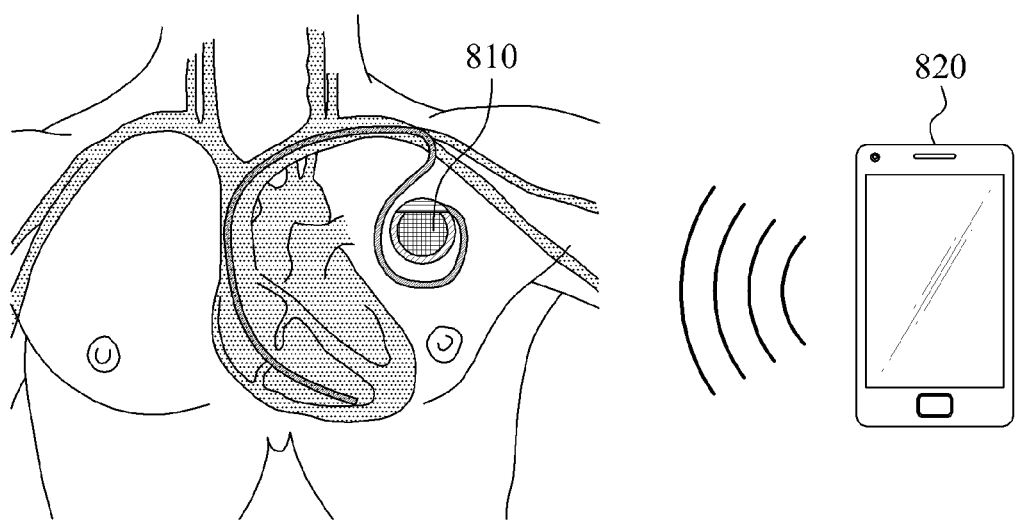
Figure 8B:
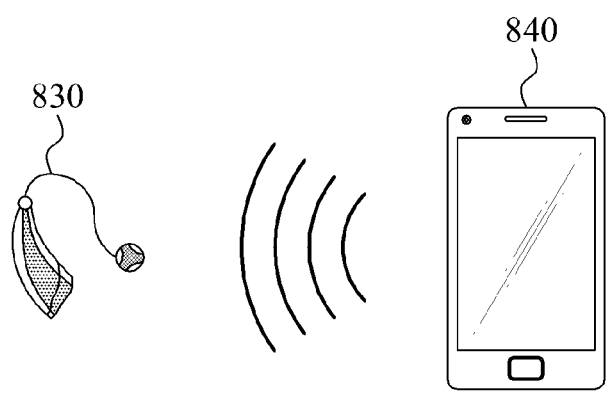

FIG. 8A illustrates an example of wireless power charging between an electronic device 810 inserted into a human body, and a mobile terminal 820. FIG. 8B illustrates an example of wireless power charging between a hearing aid 830 and a mobile terminal 840.

Referring to FIG. 8A, a wireless power transmitter and a wireless power receiver are mounted in the mobile terminal 820. Another wireless power receiver is mounted in the electronic device 810. The electronic device 810 is charged by receiving power from the mobile terminal 820.

Referring to FIG. 8B, a wireless power transmitter and a wireless power receiver are mounted in the mobile terminal 840. Another wireless power receiver is mounted in the hearing aid 830. The hearing aid 830 is charged by receiving power from the mobile terminal 840. Low-power electronic devices, for example, Bluetooth earphones, may also be charged by receiving power from the mobile terminal 840.

Figure 9:
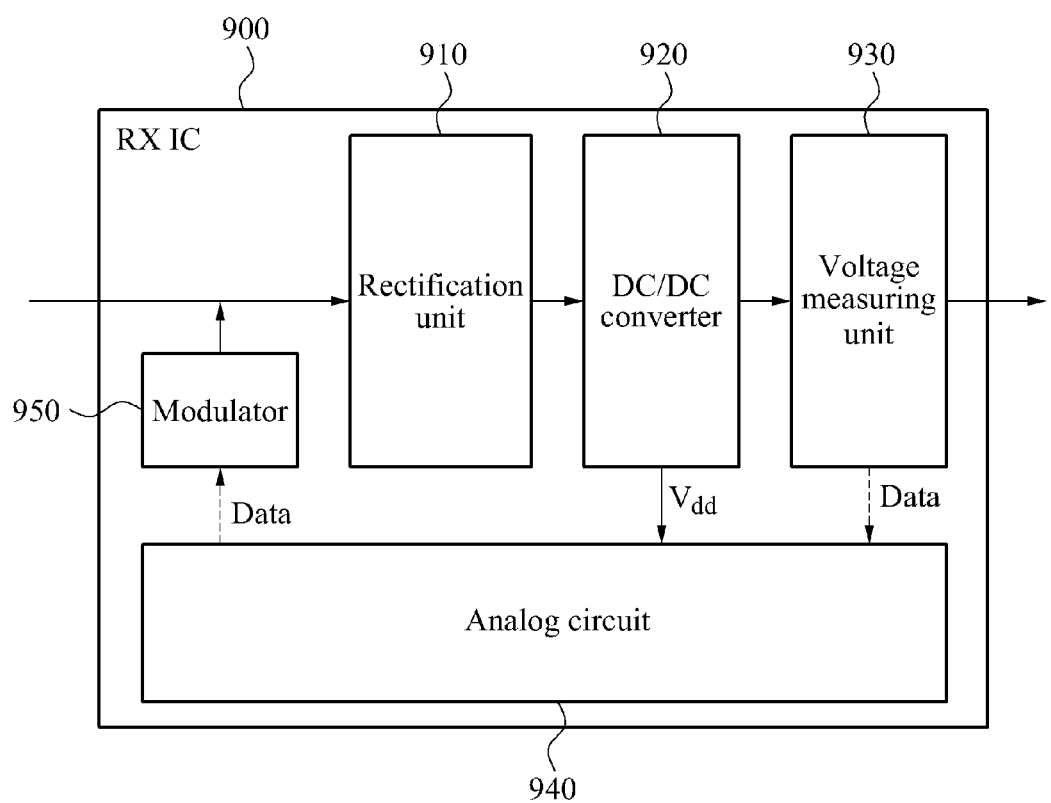
FIG. 9 is a block diagram illustrating an example of a portion of a wireless power receiver that is configured as one chip.

FIG. 9 is a block diagram illustrating an example in which a portion of a wireless power receiver that is configured as one chip. Referring to FIG. 9, an RX integrated circuit (IC) 900 is implemented as a single chip. The RX IC 900 includes a rectification unit 910, a DC/DC converter 920, a voltage measuring unit 930, an analog circuit 940, and a modulator 950. For example, the rectification unit 910, the DC/DC converter 920, the voltage measuring unit 930, the analog circuit 940, and the modulator 950 may correspond to the rectification unit 420, the DC/DC converter 430, the voltage measuring unit 440, the controller 470, and the modulator 460, respectively, of FIG. 4.

By using the analog circuit 940 to generate and output data (e.g., clock signals) to the modulator 950, there is no need to use a separate main control unit (MCU) to perform a load modulation. Additionally, the analog circuit 940 implements a signal corresponding to a charging request message, and a signal corresponding to a charging completion message, and accordingly, there is no need to use an external data connection port to code the data with one of the messages. Thus, by using the analog circuit 940, a chip size of the RX IC 900 may be reduced.

Since a communication control protocol is included in a physical operation of the analog circuit 940, an operation of programming data externally is not required. The analog circuit 940 will be further described with reference to FIG. 15.

FIGS. 10A through 12B are diagrams illustrating examples of methods of determining whether a transmission of a wireless power is started, whether the transmission of the wireless power is interrupted, and whether the transmission of the wireless power is completed, respectively, in a wireless power transmission system.

Figure 10A:
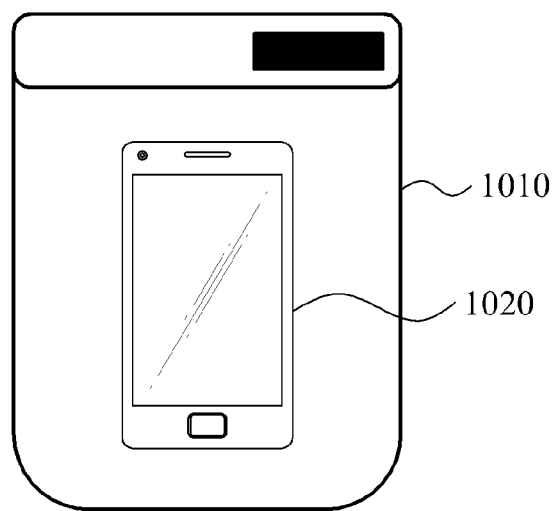
FIGS. 10A through 12B are diagrams illustrating examples of methods of determining whether a transmission of a wireless power is started, whether the transmission of the wireless power is interrupted, and whether the transmission of the wireless power is completed, respectively, in a wireless power transmission system.
Figure 10B:
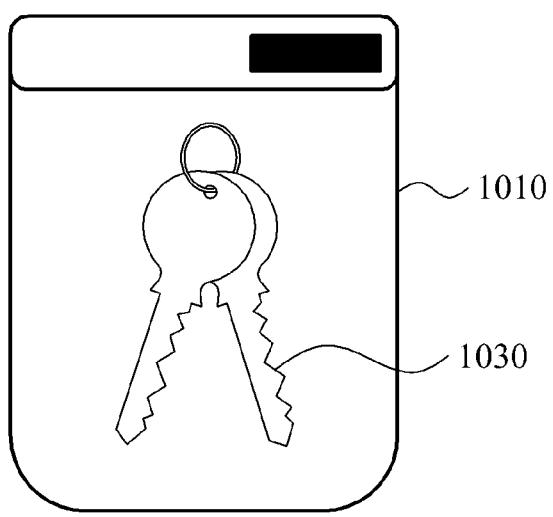

FIG. 10A illustrates an example of a mobile terminal 1020 located on a pad 1010. FIG. 10B illustrates an example of a metal object 1030 located on the pad 1010.

Referring to FIGS. 10A and 10B, a wireless power transmitter and a wireless power receiver are mounted in the pad 1010 and the mobile terminal 1020, respectively. The pad 1010 determines which one of the mobile terminal 1020 and the metal object 1030, such as a key, is located on the pad 1010.

In more detail, when the pad 1010 receives a predetermined signal (e.g., a message stating that the mobile terminal 1020 is ready to be charged) from the mobile terminal 1020 through load modulation, the pad 1010 recognizes that the mobile terminal 1020 is located in a charging area of the pad 1010, and starts wireless charging of (e.g., the transmission of the wireless power to) the mobile terminal 1020. When the pad 1010 does not receive the predetermined signal, the pad 1010 does not start charging any item, e.g., the metal object 1030. The mobile terminal 1020 may use an analog circuit to transmit the predetermined signal to the pad 1010. The predetermined signal may be load-modulated based on a number of clock signals that is set in advance between the pad 1010 and the mobile terminal 1020.

Figure 11A:
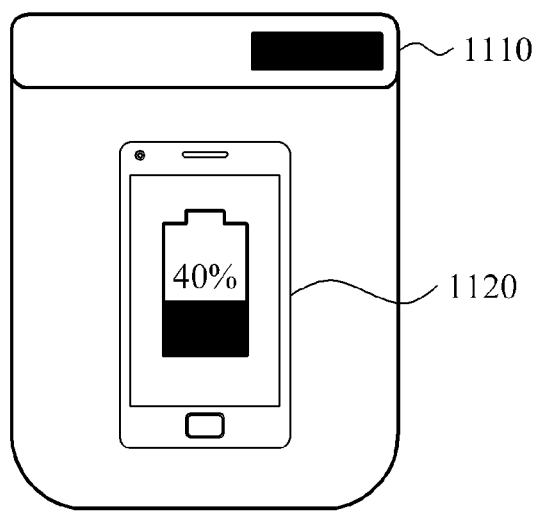
Figure 11B:
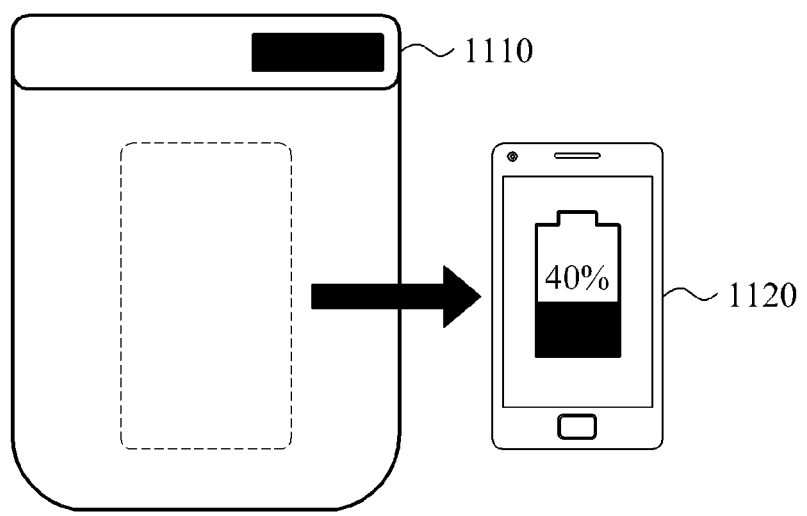

FIG. 11A illustrates an example of a mobile terminal 1120 being charged by a pad 1110. FIG. 11B illustrates an example of the wireless charging of the mobile terminal 1120 being interrupted by a movement of the mobile terminal 1120 from the pad 1110 to outside of the charging area.

Referring to FIGS. 11A and 11B, a wireless power transmitter and a wireless power receiver are mounted in the pad 1110 and the mobile terminal 1120, respectively. To stably perform the wireless charging, the pad 1110 recognizes that the mobile terminal 1120 moved outside of the charging area, and interrupts the transmission of the wireless power to the mobile terminal 1120. If the pad 1110 does not interrupt and continues the transmission of the wireless power, the wireless power may be transmitted at a power level that is irrelevant to a charging state of the mobile terminal 1120, and a large reflected wave may be generated, which may damage the pad 1110.

In more detail, when the pad 1110 receives a predetermined signal (e.g., a message stating that the mobile terminal 1120 is being charged) from the mobile terminal 1120 through the load modulation, the pad 1110 recognizes that the mobile terminal 1120 is being charged by the pad 1110. When the pad 1110 does not receive the predetermined signal, the pad 1110 recognizes that the mobile terminal 1120 moved outside of the charging area, and interrupts the transmission of the wireless power to the mobile terminal 1120. The mobile terminal 1120 may use an analog circuit to transmit the predetermined signal to the pad 1110. The predetermined signal may be load-modulated based on a number of clock signals that is set in advance between the pad 1110 and the mobile terminal 1120.

Figure 12A:
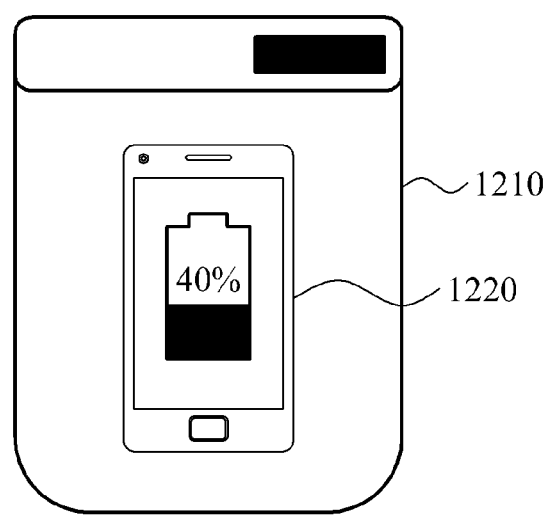
Figure 12B:
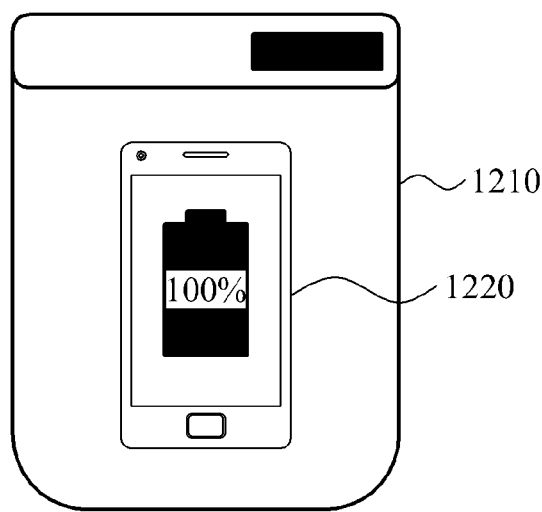

FIG. 12A illustrates an example of a mobile terminal 1220 being charged by a pad 1210. FIG. 12B illustrates an example of the wireless charging of the mobile terminal 1220 being completed.

Referring to FIGS. 12A and 12B, a wireless power transmitter and a wireless power receiver are mounted in the pad 1210 and the mobile terminal 1220, respectively. To stably perform the wireless charging, the pad 1210 recognizes that the wireless charging of the mobile terminal 1220 is completed, and interrupts the transmission of the wireless power to the mobile terminal 1220. If the pad 1210 does not interrupt and continues the transmission of the wireless power, the wireless power may be transmitted at a power level that is irrelevant to a charging state of the mobile terminal 1220, and a large reflected wave may be generated, which may damage the pad 1210. In this example, the completely-charged mobile terminal 1220 may also be damaged, since the completely-charged mobile terminal 1220 continues to receive the wireless power.

In more detail, when the pad 1210 receives a predetermined signal (e.g., a message stating that the mobile terminal 1220 is completely-charged) from the mobile terminal 1220 through the load modulation, the pad 1210 recognizes that the mobile terminal 1220 is completely-charged by the pad 1210, and interrupts the transmission of the wireless power to the mobile terminal 1220. The mobile terminal 1220 may use an analog circuit to transmit the predetermined signal to the pad 1210. The predetermined signal may be load-modulated based on consecutive (e.g., continuously output) clock signals in the mobile terminal 1220.

Figure 13:
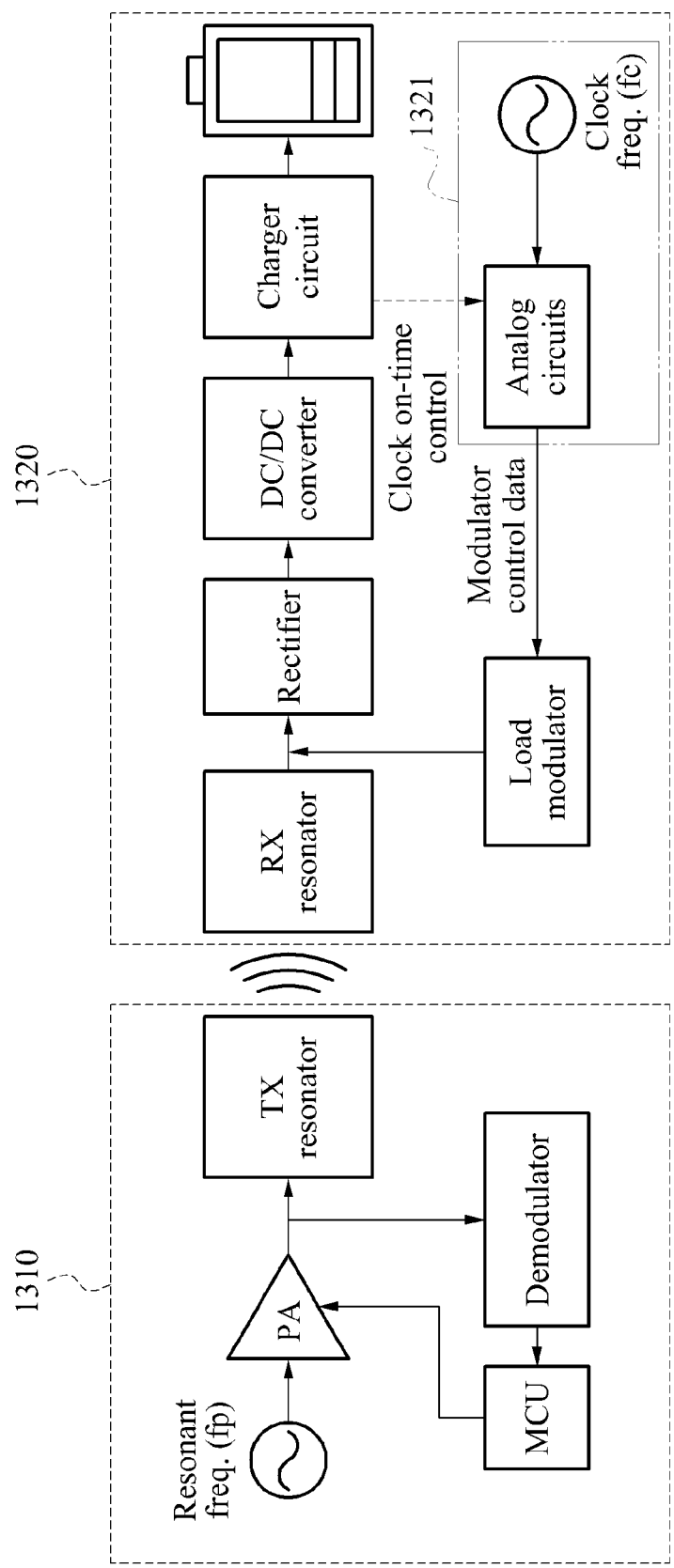
FIG. 13 is a block diagram illustrating another example of a wireless power transmission system.

FIG. 13 is a block diagram illustrating another example of a wireless power transmission system. Referring to FIG. 13, the wireless power transmission system includes a TX end 1310 that transmits a wireless power, and an RX end 1320 that receives the wireless power.

The TX end 1310 includes a power supply, a PA, a TX resonator, a MCU, and a demodulator. For example, the power supply, the PA, and the TX resonator may correspond to the power supply, the PA, and the TX resonator, respectively, of FIG. 2, and the MCU and the demodulator may correspond to the controller 510 and the demodulator 520, respectively, of FIG. 5.

The RX end 1320 includes a RX resonator, a rectifier, a DC/DC converter, a charger circuit and battery, a load modulator, and a controller 1321. For example, the RX resonator, the rectifier, the DC/DC converter, the charger circuit and battery, the load modulator, and the controller 1321 may correspond to the receiving unit 410, the rectification unit 420, the DC/DC converter 430, the load 450, the modulator 460, and the controller 470, respectively, of FIG. 4.

The RX end 1320 transmits, to the TX end 1310, a message modulated based on a length of a clock signal, to control the TX end 1310 to transmit the wireless power to the RX end 1320. The TX end 1310 and the RX end 1320 may use a load modulation scheme of performing communication control in a resonant frequency fp using in-band communication.

For example, the resonant frequency fp may be set to 6.78 MHz or 13.56 MHz. A frequency fc of the clock signal may be set to 100 KHz or 150 KHz.

The controller 1321 includes a power supply and analog circuits that generate and output the clock signal (e.g., modulator control data) to control the load modulator. The controller 1321 controls a time that the clock signal is output from the analog circuits, based on a clock on-time control signal (e.g., a voltage applied to the battery) received from the charger circuit and battery, and may adjust the length of the clock signal.

The analog circuits may adjust the length of the clock signal based on the clock on-time control signal to indicate data, e.g., a charging state of the battery. The data may include, for example, charging request information, charging continuation information, or charging completion information, as described herein.

Figure 14A:
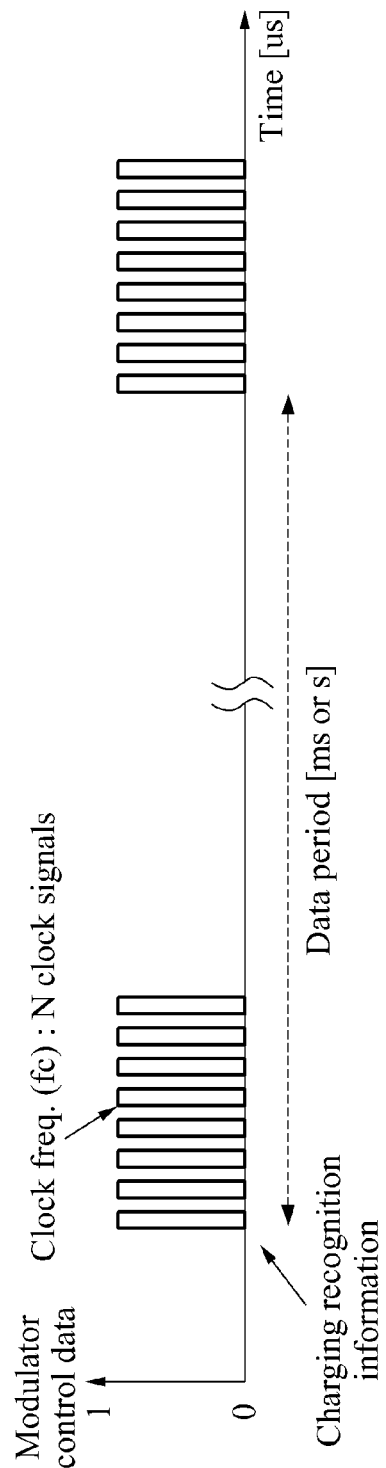
FIGS. 14A and 14B are graphs illustrating examples of two types of clock signals, respectively, that indicate control information in a wireless power receiver.
Figure 14B:
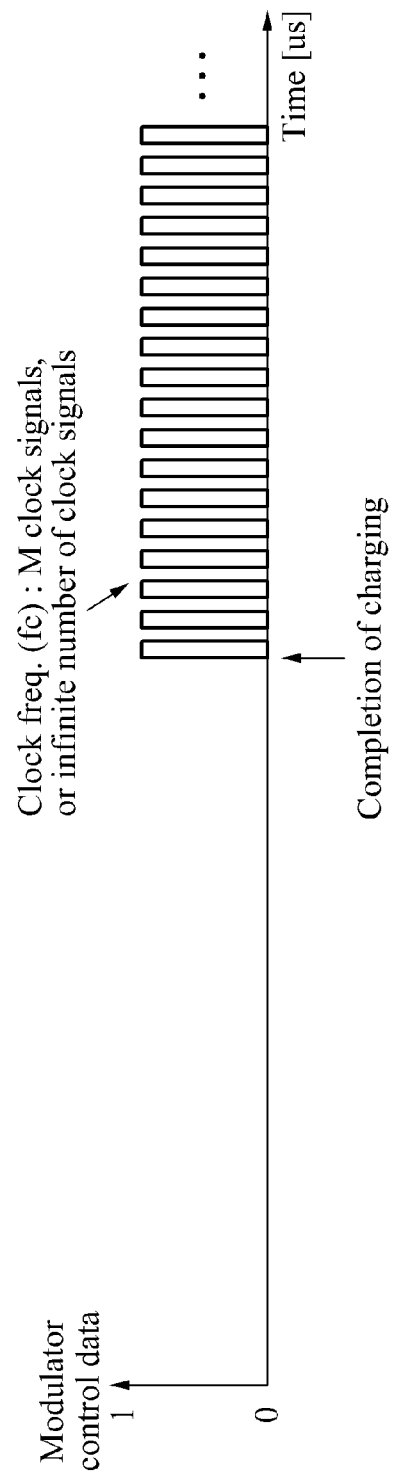

FIGS. 14A and 14B are graphs illustrating examples of two types of clock signals, respectively, that indicate control information in a wireless power receiver. The two types of the clock signals may be generated and output through an analog circuit. Each of the two types of the clock signals may be referred to as modulator control data, and is output to control a load modulator.

FIG. 14A illustrates an example of modulator control data indicating charging request information or charging continuation information, e.g., information indicating that charging in the wireless power receiver is requested or being performed. FIG. 14B illustrates an example of modulator control data indicating charging completion information, e.g., information indicating that the charging is completed.

Referring to FIG. 14A, to provide the information indicating that the charging is requested or being performed, using the analog circuit, the wireless power receiver may generate and output, to the load modulator, N clock signals periodically every few milliseconds (ms) or few seconds (s). A frequency of the N clock signals may be represented by fc. A length of time in which the N clock signals are output may be referred to as a length of the clock signals.

For example, when the wireless power receiver receives a wireless power of an initial ping signal from a wireless power transmitter, and is charged by the wireless power corresponding to a minimum power needed to operate the wireless power receiver, using the analog circuit, the wireless power receiver may generate and output, to the load modulator, eight clock signals of 100 KHz periodically every 0.1 second. In this example, when the wireless power transmitter determines that the eight clock signals of 100 KHz are output, the wireless power transmitter recognizes that the wireless power receiver is located in a charging area, and transmits a wireless power for about two seconds longer than a period of a clock signal. During the charging, the wireless power receiver may periodically generate and output the eight clock signals of 100 KHz.

When the wireless power receiver moves out of the charging area during the charging, the wireless power receiver does not generate and output the eight clock signals, and the wireless power transmitter does not determine that the eight clock signals are output. In this example, the wireless power transmitter interrupts the transmission of the wireless power at a time after about two seconds from a time at which a last clock signal among the eight clock signals is output.

Referring to FIG. 14B, to provide the information indicating that the charging is completed, using the analog circuit, the wireless power receiver may generate and continuously output, to the load modulator, at least M clock signals, or an infinite number of clock signals. A frequency of the clock signals may be represented by fc. A length of time in which the clock signals are output may be referred to as a length of the clock signals.

For example, when charging completion is detected, using the analog circuit, the wireless power receiver generates and continuously outputs, to the load modulator, 20 clock signals of 100 KHz. In this example, when the wireless power transmitter determines that the 20 clock signals of 100 KHz are continuously output, the wireless power transmitter recognizes that the wireless power receiver is completely-charged, and interrupts the transmission of the wireless power.

Figure 15:
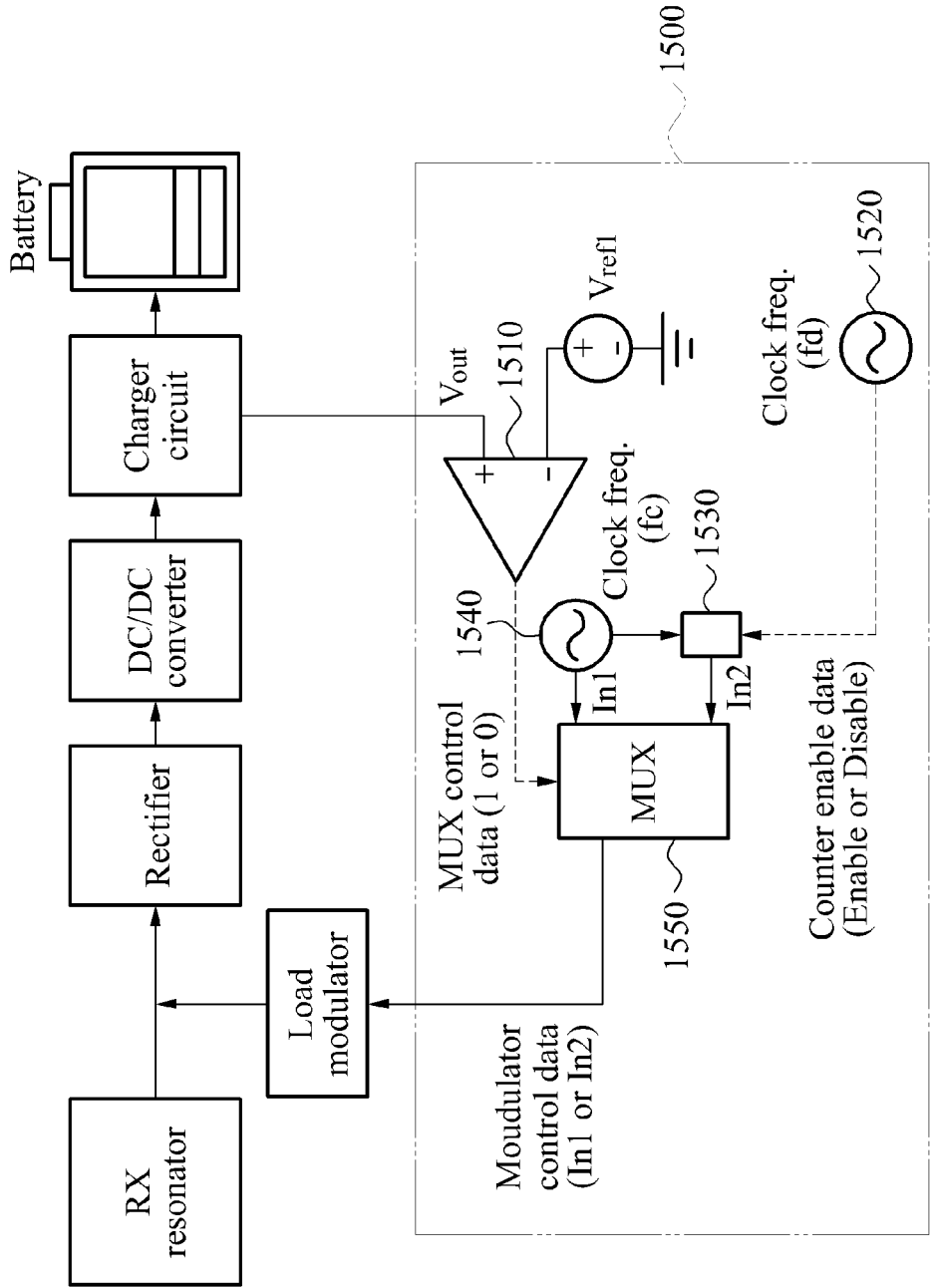
FIG. 15 is a diagram illustrating an example of an analog circuit in a wireless power receiver.

FIG. 15 is a diagram illustrating an example of an analog circuit 1500 in a wireless power receiver. Referring to FIG. 15, the analog circuit 1500 includes a comparator 1510, a clock generator 1520, a bit counter 1530, a clock generator 1540, and a MUX 1550.

The comparator 1510 receives and compares a voltage $V_{out}$ of a charger circuit with a reference voltage $V_{ref1}$. The voltage $V_{out}$ includes a voltage applied to a battery being charged, and the reference voltage $V_{ref1}$ includes a voltage measured when the battery is completely-charged. The comparator 1510 outputs, to the MUX 1550, MUX control data, which is '1' or '0' based on a result of the comparison. In more detail, when the voltage $V_{out}$ is less than the reference voltage $V_{ref1}$, the comparator 1510 outputs '0'. When the voltage $V_{out}$ is greater than or equal to the reference voltage $V_{ref1}$, the comparator 1510 outputs '1'. When the voltage $V_{out}$ is less than the reference voltage $V_{ref1}$, the battery is to be charged.

When the voltage $V_{out}$ is greater than or equal to the reference voltage $V_{ref1}$, the battery is completely-charged.

The clock generator 1520 generates and outputs, to the bit counter 1530, a clock signal including a frequency fd. The clock signal may be referred to as counter enable data, and is used as an activation signal of the bit counter 1530. That is, the clock signal enables and disables an operation of the bit counter 1530. The frequency fd may be set to 10 Hz.

When the bit counter 1530 receives the clock signal from the clock generator 1520, the bit counter 1530 operates. If the bit counter 1530 is a 3-bit counter, the bit counter 1530 may count up to eight clock signals among clock signals received from the clock generator 1540. If the bit counter 1530 is an n-bit counter, the bit counter 1530 may count up to $2^n$ clock signals among the clock signals received from the clock generator 1540. The bit counter 1530 outputs the counted clock signals to the MUX 1550.

The clock generator 1540 generates and outputs, to the bit counter 1530 and the MUX 1550, clock signal including a frequency fc. The frequency fc may be set to 100 KHz. 'In1' may refer to the clock signals output from the clock generator 1540, and 'In2' may refer to the counted clock signals output from the bit counter 1530. Additionally, 'In1' may refer to charging completion information, and 'In2' may refer to charging request information or charging continuation information.

When the MUX 1550 receives '0' from the comparator 1510, the MUX 1550 outputs, to a load modulator, 'In2' as modulator control data. For example, if the bit counter 1530 is the 3-bit counter, the bit counter 1530 may transmit, to the MUX 1550, the counted eight clock signals among the clock signals received from the clock generator 1540. The MUX 1550 may output, to the load modulator, the received eight clock signals as the modulator control data.

When the MUX 1550 receives '1' from the comparator 1510, the MUX 1550 outputs, to the load modulator, 'In1' as the modulator control data. For example, the MUX 1550 may output, to the load modulator, the clock signals received from the clock generator 1540 as the modulator control data.

Figure 16:
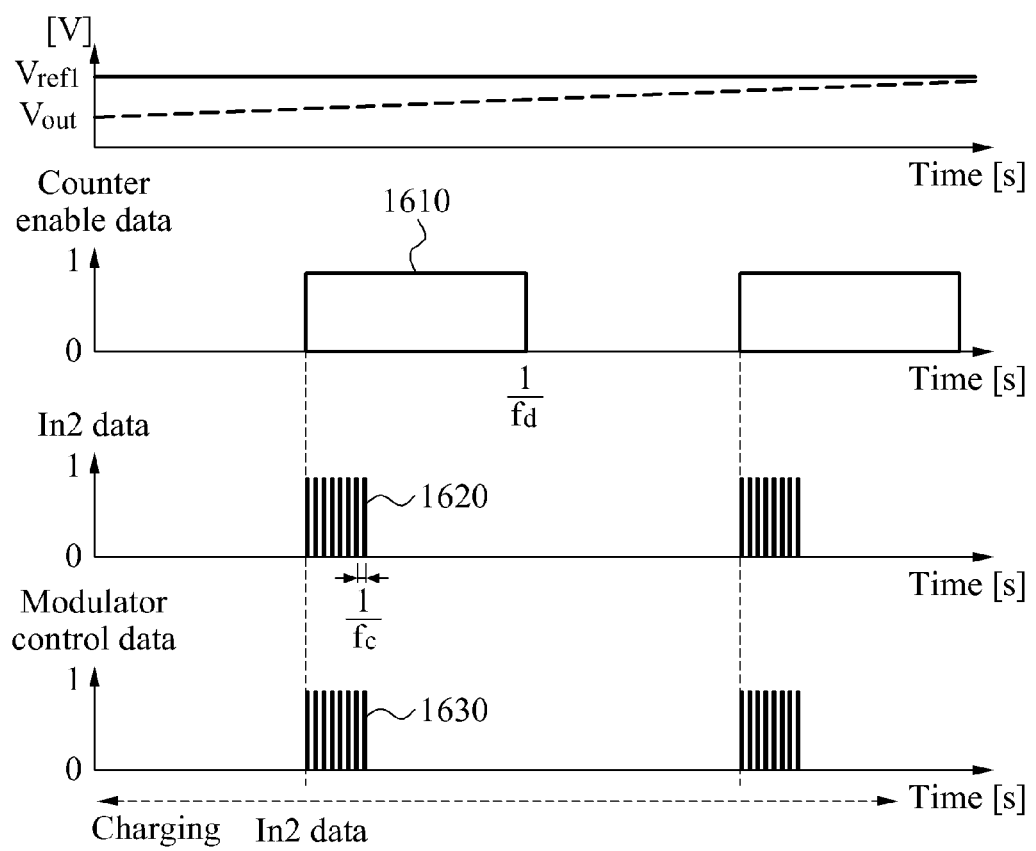
FIG. 16 is a graph illustrating an example of control information requesting a start of charging, and an example of control information indicating that the charging is being performed, in a wireless power receiver.

FIG. 16 are graphs illustrating an example of control information requesting a start of charging, and an example of control information indicating that the charging, is being performed in a wireless power receiver. Referring to FIG. 16, since the wireless power receiver is being charged, a voltage $V_{out}$ is less than a reference voltage $V_{ref1}$. The voltage $V_{out}$ includes a voltage applied to the wireless power receiver being charged, and the reference voltage $V_{ref1}$ includes a voltage measured when the wireless power receiver is completely-charged.

When the voltage $V_{out}$ is less than the reference voltage $V_{ref1}$, the comparator 1510 of FIG. 15 outputs '0' as MUX control data. The clock generator 1520 of FIG. 15 may generate and output a clock signal every 0.1 second, and a frequency $f_d$ of the clock signal may be set to 10 Hz. The clock signal is referred to as as counter enable data 1610 to enable and disable an operation of the bit counter 1530 of FIG. 15.

The bit counter 1530 generates and outputs In2 data 1620, which may include eight clock signals that are generated and output every 0.1 second. A frequency $f_e$ of the eight clock signals may be set to 100 KHz.

The MUX 1550 of FIG. 15 uses the In2 data 1620 as modulator control data 1630. For example, the MUX 1550 may use the eight clock signals of the In2 data 1620 as the modulator control data 1630, every time the operation of the bit counter 1530 is enabled by the counter enable data 1610, e.g., every time the counter enable data 1610 is '1'.

Figure 17:
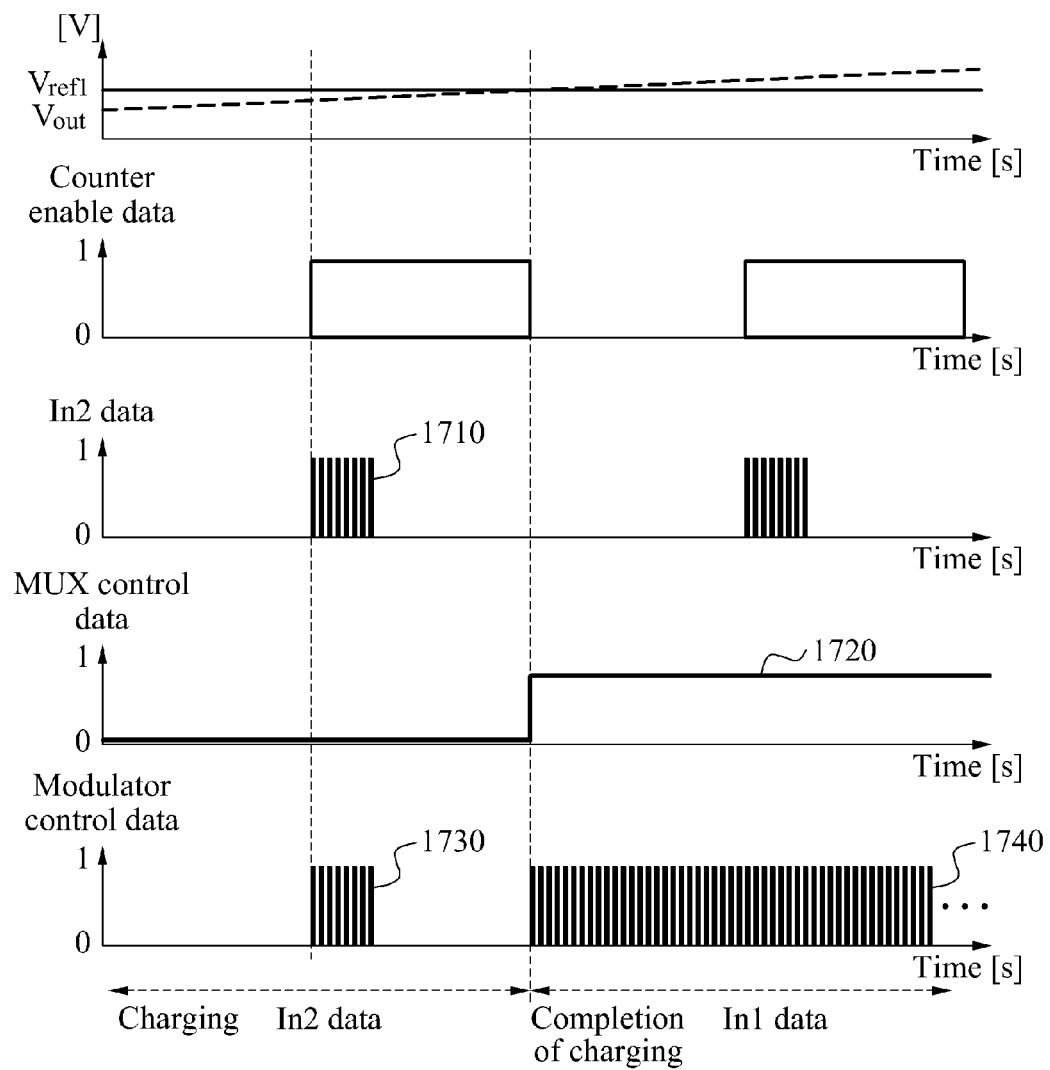
FIG. 17 is a graph illustrating an example of control information indicating that charging is completed in a wireless power receiver.

FIG. 17 is a graph illustrating an example of control information indicating that charging is completed in a wireless power receiver. Referring to FIG. 17, when the charging of the wireless power receiver is completed, a voltage $V_{out}$ is greater than or equal to the reference voltage $V_{ref1}$. The voltage $V_{out}$ includes a voltage applied to the wireless power receiver being charged, and the reference voltage $V_{ref1}$ includes a voltage measured when the wireless power receiver is completely-charged.

When the voltage $V_{out}$ is less than the reference voltage $V_{ref1}$, the comparator 1510 of FIG. 15 outputs '0' as MUX control data. In this example, when the clock generator 1520 of FIG. 15 generates and outputs '1' as counter enable data, and the bit counter 1530 of FIG. 15 generates and outputs In2 data 1710, the MUX 1550 of FIG. 15 uses the In2 data 1710 as modulator control data 1730.

When the voltage $V_{out}$ is greater than or equal to the reference voltage $V_{ref1}$, the comparator 1510 outputs '1' as MUX control data 1720, and the MUX 1550 uses In1 data as modulator control data 1740. The In1 data may include clock signals of 100 KHz that are generated and continuously output by the clock generator 1540 of FIG. 15.

FIG. 18 is a flowchart illustrating an example of a wireless power transmission method. For example, the wireless power transmission method may be performed by the wireless power transmitter of FIG. 5.

In operation 1810, the wireless power transmitter periodically transmits a ping signal to a wireless power receiver. A wireless power of the ping signal may include minimum power that is needed by the wireless power receiver to generate and output a clock signal.

In operation 1820, the wireless power transmitter determines whether initial charging recognition data (e.g., charging request information) is received from the wireless power receiver. When the initial charging recognition data is not received, the method returns to operation 1810. Otherwise, the method continues in operation 1830.

In operation 1830, the wireless power transmitter transmits a wireless power to the wireless power receiver.

In operation 1840, the wireless power transmitter determines whether the charging recognition data (e.g., charging continuation information) is continuously received from the wireless power receiver. When the charging recognition data is not continuously received, the wireless power transmitter interrupts the transmission of the wireless power to the wireless power receiver, and the method returns to operation 1810. Otherwise, the method continues in operation 1850.

In operation 1850, the wireless power transmitter continues to transmit the wireless power to the wireless power receiver.

In operation 1860, the wireless power transmitter determines whether charging completion data (e.g., charging completion information) is received from the wireless power receiver. When the charging completion data is not received, the method returns to operation 1830. Otherwise, the method continues in operation 1870.

In operation 1870, the wireless power transmitter terminates charging of the wireless power receiver.

Figure 19A:
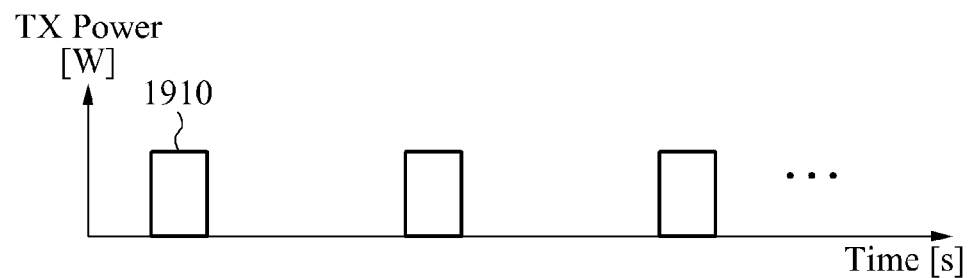
FIGS. 19A through 19C are graphs illustrating an example of an operation of initially charging, an example of an operation of continuing the charging, and an example of an operation of completing the charging, respectively, in a wireless power transmission method.
Figure 19B:
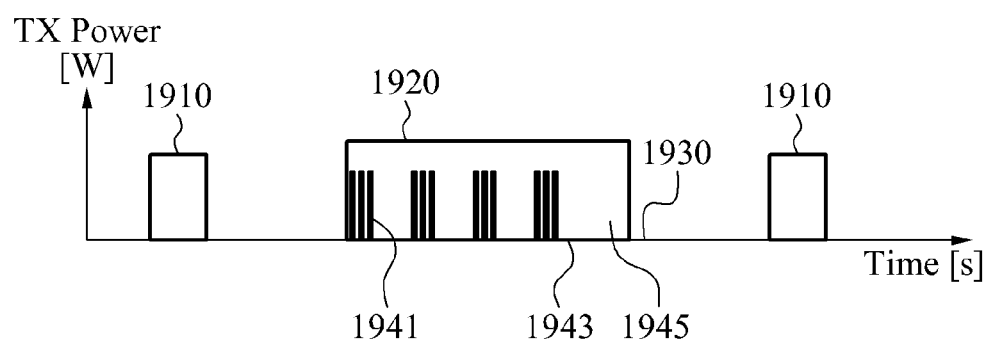
Figure 19C:
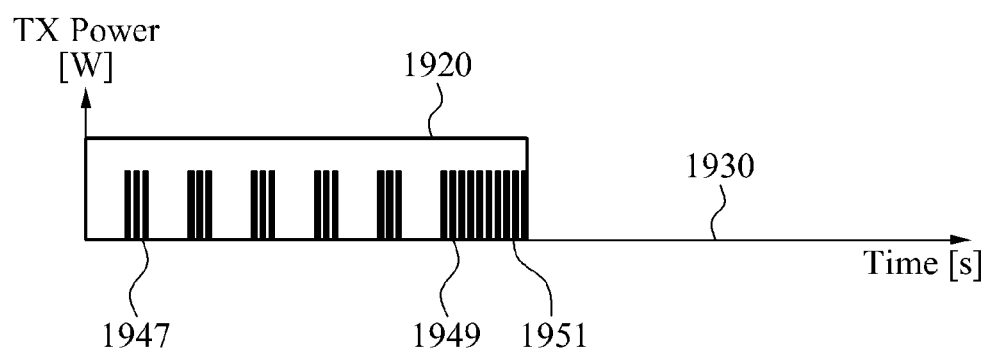

FIGS. 19A through 19C are graphs illustrating an example of an operation of initially charging, an example of an operation of continuing the charging, and an example of an operation of completing the charging, respectively, in a wireless power transmission method. That is, the graphs of FIGS. 19A through 19C illustrate initial charging recognition data, charging recognition data, and charging completion data, respectively, that a wireless power transmitter receives from a wireless power receiver.

In more detail, FIG. 19A illustrates a ping signal 1910 transmitted from the wireless power transmitter to the wireless power receiver. FIG. 19B illustrates initial charging recognition data 1941 that the wireless power transmitter receives from the wireless power receiver, and a time 1945 at which receiving of charging recognition data is terminated. FIG. 19C illustrates charging completion data 1951 that the wireless power transmitter receives from the wireless power receiver.

Referring to FIG. 19A, the wireless power transmitter periodically transmits the ping signal 1910 to the wireless power receiver.

Referring to FIG. 19B, when the wireless power transmitter receives the initial charging recognition data 1941 from the wireless power receiver, the wireless power transmitter transmits a wireless power 1920 to the wireless power receiver. The wireless power transmitter determines whether the charging recognition data is continuously received. A type of the charging recognition data may be identical to a type of the initial charging recognition data 1941. When the wireless power receiver moves outside a charging area at a time 1943, the wireless power transmitter determines, at a time 1945, that the receiving of the charging recognition data is terminated, and interrupts the transmission of the wireless power at a time 1930.

Referring to FIG. 19C, the wireless power transmitter continuously receives charging recognition data 1947 from the wireless power receiver, and continuously transmits the wireless power 1920 to the wireless power receiver. When the charging is completed at a time 1949, and the charging completion data 1951 is received from the wireless power receiver, the wireless power transmitter interrupts the transmission of the wireless power at the time 1930.

According to the teachings above, there is provided a wireless power receiver that transmits, to a wireless power transmitter, a variety of set messages, for example, a charging request message, a charging continuation message, and a charging completion message, using an analog circuit. Accordingly, a complexity of an implementation of the wireless power receiver is reduced. Due to the reduction in the complexity of the implementation, the wireless power receiver may be implemented with one chip with a small size. Additionally, the wireless power receiver performs load modulation based on a length of a clock signal to transmit the messages.

Furthermore, there is provided a wireless power transmission system that wirelessly charges a device, and minimizes an amount of data required to control the wireless charging. In addition, the wireless power transmission system may be implemented through an analog circuit, to stably perform the wireless charging using only required operations.

Moreover, there is provided a wireless power receiver changes a length of a clock signal, to generate and transmit, to a wireless power transmitter, charging recognition data and charging completion data. Accordingly, a complex MCU that generates random data may not need to be used. Additionally, the wireless power receiver generates communication control data using an analog circuit, instead of using a MCU, and accordingly, the wireless power receiver may be manufactured as one chip. Thus, a size and costs of the wireless power receiver may be reduced. Furthermore, the wireless power receiver may be applied to applications requiring a very small size, for example, hearing aids and/or medical devices, since the wireless power receiver may be manufactured as one chip enabling communication control.

In the following description, the term "resonator" used in the discussion of FIGS. 20A through 22B refers to both a source resonator and a target resonator. The resonators of FIGS. 20A through 22B may be applied to the resonators of FIGS. 1 through 19C.

Figure 20A:
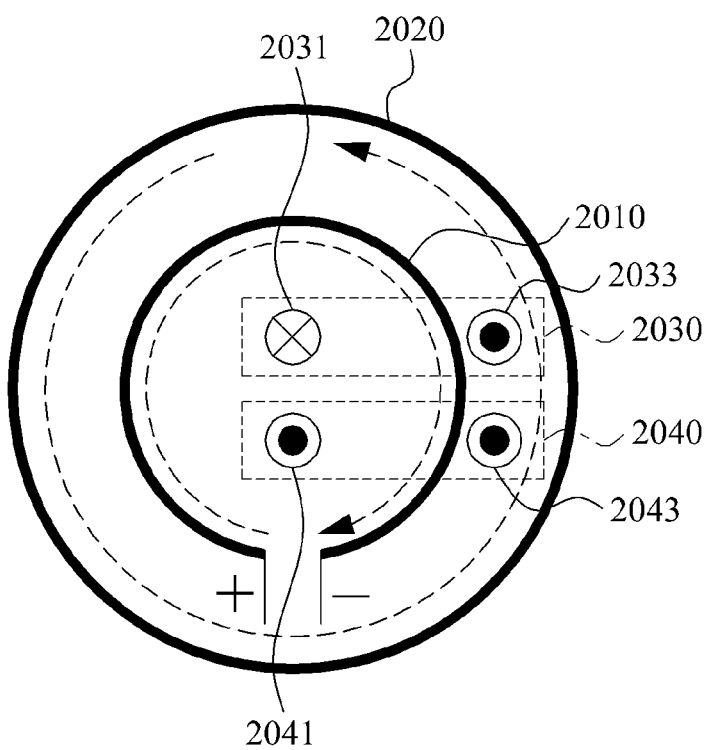
FIGS. 20A through 20B are diagrams illustrating examples of a distribution of a magnetic field in a feeder and a resonator of a wireless power transmitter.
Figure 20B:
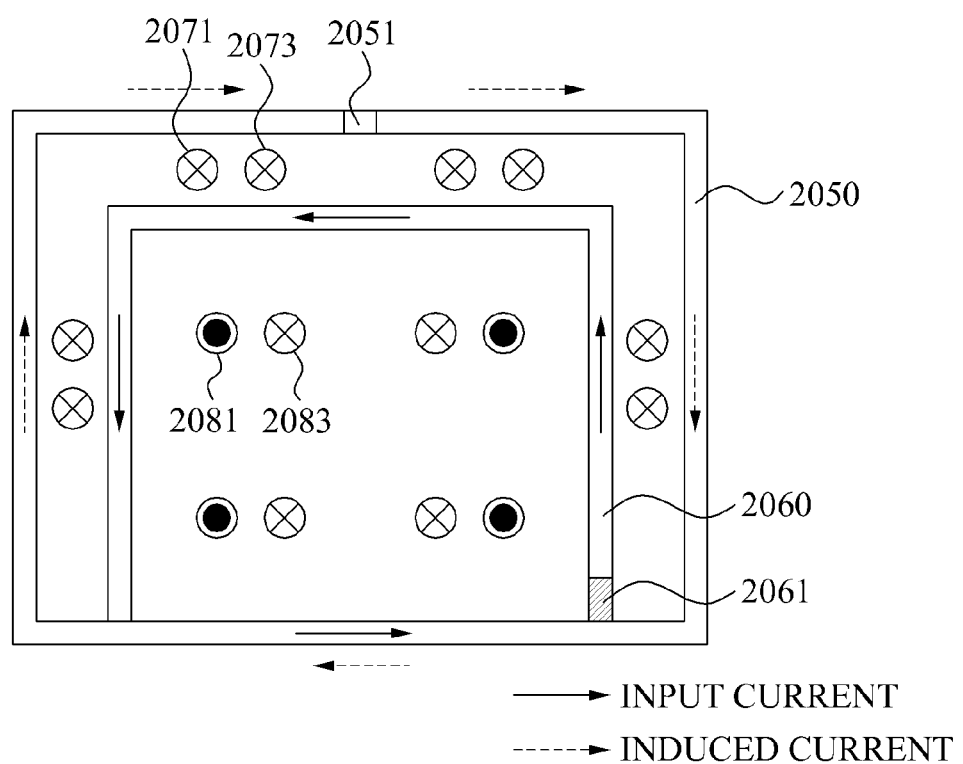

FIGS. 20A and 20B are diagrams illustrating examples of a distribution of a magnetic field in a feeder and a resonator of a wireless power transmitter. When a resonator receives power supplied through a separate feeder, magnetic fields are formed in both the feeder and the resonator.

FIG. 20A illustrates an example of a structure of a wireless power transmitter in which a feeder 2010 and a resonator 2020 do not have a common ground. Referring to FIG. 20A, as an input current flows into a feeder 2010 through a terminal labeled "+" and out of the feeder 2010 through a terminal labeled "−", a magnetic field 2030 is formed by the input current. A direction 2031 of the magnetic field 2030 inside the feeder 2010 is into the plane of FIG. 20A, and has a phase that is opposite to a phase of a direction 2033 of the magnetic field 2030 outside the feeder 2010. The magnetic field 2030 formed by the feeder 2010 induces a current to flow in a resonator 2020. The direction of the induced current in the resonator 2020 is opposite to a direction of the input current in the feeder 2010 as indicated by the dashed arrows in FIG. 20A.

The induced current in the resonator 2020 forms a magnetic field 2040. Directions of the magnetic field 2040 are the same at all positions inside the resonator 2020. Accordingly, a direction 2041 of the magnetic field 2040 formed by the resonator 2020 inside the feeder 2010 has the same phase as a direction 2043 of the magnetic field 2040 formed by the resonator 2020 outside the feeder 2010.

Consequently, when the magnetic field 2030 formed by the feeder 2010 and the magnetic field 2040 formed by the resonator 2020 are combined, a strength of the total magnetic field inside the resonator 2020 decreases inside the feeder 2010 and increases outside the feeder 2010. In an example in which power is supplied to the resonator 2020 through the feeder 2010 configured as illustrated in FIG. 20A, the strength of the total magnetic field decreases in the center of the resonator 2020, but increases outside the resonator 2020. In another example in which a magnetic field is randomly distributed in the resonator 2020, it is difficult to perform impedance matching since an input impedance will frequently vary. Additionally, when the strength of the total magnetic field increases, an efficiency of wireless power transmission increases. Conversely, when the strength of the total magnetic field is decreases, the efficiency of wireless power transmission decreases. Accordingly, the power transmission efficiency may be reduced on average.

FIG. 20B illustrates an example of a structure of a wireless power transmitter in which a resonator 2050 and a feeder 2060 have a common ground. The resonator 2050 includes a capacitor 2051. The feeder 2060 receives a radio frequency (RF) signal via a port 2061. When the RF signal is input to the feeder 2060, an input current is generated in the feeder 2060. The input current flowing in the feeder 2060 forms a magnetic field, and a current is induced in the resonator 2050 by the magnetic field. Additionally, another magnetic field is formed by the induced current flowing in the resonator 2050. In this example, a direction of the input current flowing in the feeder 2060 has a phase opposite to a phase of a direction of the induced current flowing in the resonator 2050. Accordingly, in a region between the resonator 2050 and the feeder 2060, a direction 2071 of the magnetic field formed by the input current has the same phase as a direction 2073 of the magnetic field formed by the induced current, and thus the strength of the total magnetic field increases in the region between the resonator 2050 and the feeder 2060. Conversely, inside the feeder 2060, a direction 2081 of the magnetic field formed by the input current has a phase opposite to a phase of a direction 2083 of the magnetic field formed by the induced current, and thus the strength of the total magnetic field decreases inside the feeder 2060. Therefore, the strength of the total magnetic field decreases in the center of the resonator 2050, but increases outside the resonator 2050.

An input impedance may be adjusted by adjusting an internal area of the feeder 2060. The input impedance refers to an impedance viewed in a direction from the feeder 2060 to the resonator 2050. When the internal area of the feeder 2060 is increased, the input impedance is increased. Conversely, when the internal area of the feeder 2060 is decreased, the input impedance is decreased. Because the magnetic field is randomly distributed in the resonator 2050 despite a reduction in the input impedance, a value of the input impedance may vary based on a location of a target device. Accordingly, a separate matching network may be required to match the input impedance to an output impedance of a power amplifier. For example, when the input impedance is increased, a separate matching network may be used to match the increased input impedance to a relatively low output impedance of the power amplifier.

Figure 21A:
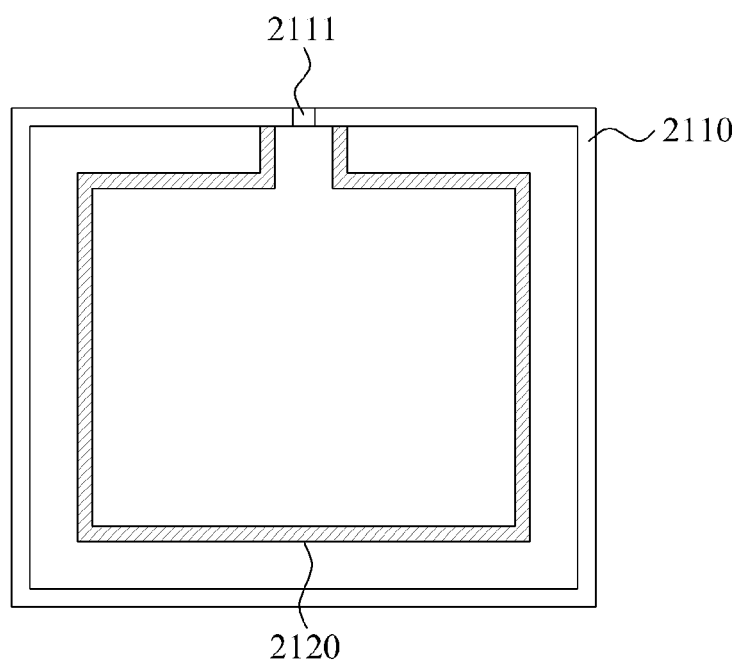
FIGS. 21A and 21B are diagrams illustrating an example of a feeding unit and a resonator of a wireless power transmitter.
Figure 21B:
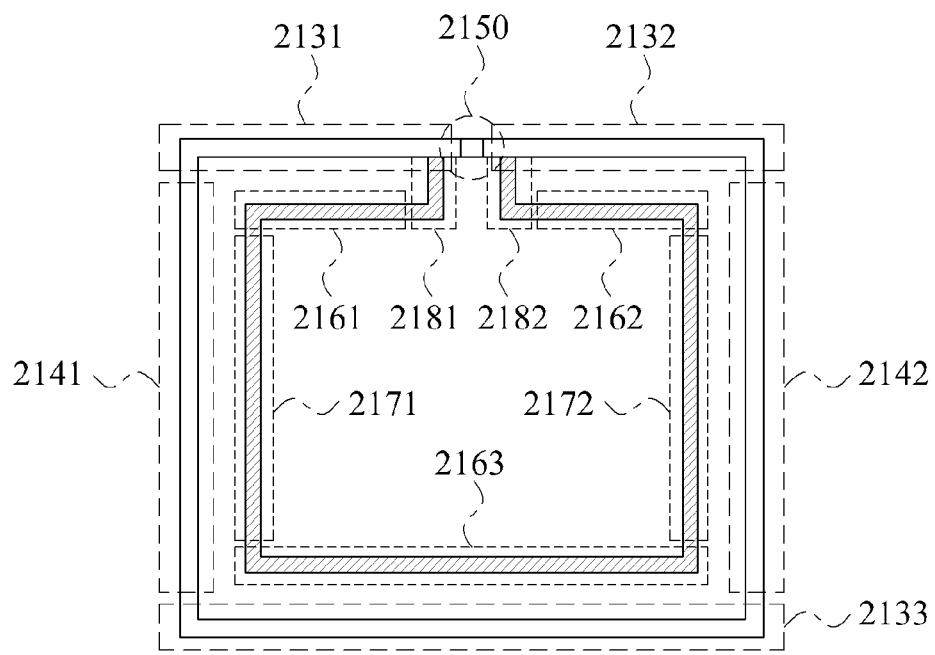

FIGS. 21A and 21B are diagrams illustrating an example of a feeding unit and a resonator of a wireless power transmitter. Referring to FIG. 21A, the wireless power transmitter includes a resonator 2110 and a feeding unit 2120. The resonator 2110 further includes a capacitor 2111. The feeding unit 2120 is electrically connected to both ends of the capacitor 2111.

FIG. 21B illustrates, in greater detail, a structure of the wireless power transmitter of FIG. 21A. The resonator 2110 includes a first transmission line (not identified by a reference numeral in FIG. 21B, but formed by various elements in FIG. 21B as discussed below), a first conductor 2141, a second conductor 2142, and at least one capacitor 2150.

The capacitor 2150 is inserted in series between a first signal conducting portion 2131 and a second signal conducting portion 2132, causing an electric field to be confined within the capacitor 2150. Generally, a transmission line includes at least one conductor in an upper portion of the transmission line, and at least one conductor in a lower portion of first transmission line. A current may flow through the at least one conductor disposed in the upper portion of the first transmission line, and the at least one conductor disposed in the lower portion of the first transmission line may be electrically grounded. In this example, a conductor disposed in an upper portion of the first transmission line in FIG. 21B is separated into two portions that will be referred to as the first signal conducting portion 2131 and the second signal conducting portion 2132. A conductor disposed in a lower portion of the first transmission line in FIG. 21B will be referred to as a first ground conducting portion 2133.

As illustrated in FIG. 21B, the resonator 2110 has a generally two-dimensional (2D) structure. The first transmission line includes the first signal conducting portion 2131 and the second signal conducting portion 2132 in the upper portion of the first transmission line, and includes the first ground conducting portion 2133 in the lower portion of the first transmission line. The first signal conducting portion 2131 and the second signal conducting portion 2132 are disposed to face the first ground conducting portion 2133. A current flows through the first signal conducting portion 2131 and the second signal conducting portion 2132.

One end of the first signal conducting portion 2131 is connected to one end of the first conductor 2141, the other end of the first signal conducting portion 2131 is connected to the capacitor 2150, and the other end of the first conductor 2141 is connected to one end of the first ground conducting portion 2133. One end of the second signal conducting portion 2132 is connected to one end of the second conductor 2142, the other end of the second signal conducting portion 2132 is connected to the other end of the capacitor 2150, and the other end of the second conductor 2142 is connected to the other end of the ground conducting portion 2133. Accordingly, the first signal conducting portion 2131, the second signal conducting portion 2132, the first ground conducting portion 2133, the first conductor 2141, and the second conductor 2142 are connected to each other, causing the resonator 2110 to have an electrically closed loop structure. The term "loop structure" includes a polygonal structure, a circular structure, a rectangular structure, and any other geometrical structure that is closed, i.e., that does not have any opening in its perimeter. The expression "having a loop structure" indicates a structure that is electrically closed.

The capacitor 2150 is inserted into an intermediate portion of the first transmission line. In the example in FIG. 21B, the capacitor 2150 is inserted into a space between the first signal conducting portion 2131 and the second signal conducting portion 2132. The capacitor 2150 may be a lumped element capacitor, a distributed capacitor, or any other type of capacitor known to one of ordinary skill in the art. For example, a distributed element capacitor may include a zigzagged conductor line and a dielectric material having a relatively high permittivity disposed between parallel portions of the zigzagged conductor line.

The capacitor 2150 inserted into the first transmission line may cause the resonator 2110 to have a characteristic of a metamaterial. A metamaterial is a material having a predetermined electrical property that is not found in nature, and thus may have an artificially designed structure. All materials existing in nature have a magnetic permeability and permittivity. Most materials have a positive magnetic permeability and/or a positive permittivity.

For most materials, a right-hand rule may be applied to an electric field, a magnetic field, and a Poynting vector of the materials, so the materials may be referred to as right-handed materials (RHMs). However, a metamaterial that has a magnetic permeability and/or a permittivity that is not found in nature, and may be classified into an epsilon negative (ENG) material, a mu negative (MNG) material, a double negative (DNG) material, a negative refractive index (NRI) material, a left-handed (LH) material, and other metamaterial classifications known to one of ordinary skill in the art based on a sign of the magnetic permeability of the metamaterial and a sign of the permittivity of the metamaterial.

If the capacitor 2150 is a lumped element capacitor and a capacitance of the capacitor 2150 is appropriately determined, the resonator 2110 may have a characteristic of a metamaterial. If the resonator 2110 is caused to have a negative magnetic permeability by appropriately adjusting the capacitance of the capacitor 2150, the resonator 2110 may also be referred to as an MNG resonator. Various criteria may be applied to determine the capacitance of the capacitor 2150. For example, the various criteria may include a criterion for enabling the resonator 2110 to have the characteristic of the metamaterial, a criterion for enabling the resonator 2110 to have a negative magnetic permeability at a target frequency, a criterion for enabling the resonator 2110 to have a zeroth order resonance characteristic at the target frequency, and any other suitable criterion. Based on any one or any combination of the aforementioned criteria, the capacitance of the capacitor 2150 may be appropriately determined.

The resonator 2110, hereinafter referred to as the MNG resonator 2110, may have a zeroth order resonance characteristic of having a resonance frequency when a propagation constant is "0". If the MNG resonator 2110 has the zeroth order resonance characteristic, the resonance frequency is independent of a physical size of the MNG resonator 2110. By changing the capacitance of the capacitor 2150, the resonance frequency of the MNG resonator 2110 may be changed without changing the physical size of the MNG resonator 2110.

In a near field, the electric field is concentrated in the capacitor 2150 inserted into the first transmission line, causing the magnetic field to become dominant in the near field. The MNG resonator 2110 has a relatively high Q-factor when the capacitor 2150 is a lumped element, thereby increasing a power transmission efficiency. The Q-factor indicates a level of an ohmic loss or a ratio of a reactance with respect to a resistance in the wireless power transmission. As will be understood by one of ordinary skill in the art, the efficiency of the wireless power transmission will increase as the Q-factor increases.

Although not illustrated in FIG. 21B, a magnetic core passing through the MNG resonator 2110 may be provided to increase a power transmission distance.

Referring to FIG. 21B, the feeding unit 2120 includes a second transmission line (not identified by a reference numeral in FIG. 21B, but formed by various elements in FIG. 21B as discussed below), a third conductor 2171, a fourth conductor 2172, a fifth conductor 2181, and a sixth conductor 2182.

The second transmission line includes a third signal conducting portion 2161 and a fourth signal conducting portion 2162 in an upper portion of the second transmission line, and includes a second ground conducting portion 2163 in a lower portion of the second transmission line. The third signal conducting portion 2161 and the fourth signal conducting portion 2162 are disposed to face the second ground conducting portion 2163. A current flows through the third signal conducting portion 2161 and the fourth signal conducting portion 2162.

One end of the third signal conducting portion 2161 is connected to one end of the third conductor 2171, the other end of the third signal conducting portion 2161 is connected to one end of the fifth conductor 2181, and the other end of the third conductor 2171 is connected to one end of the second ground conducting portion 2163. One end of the fourth signal conducting portion 2162 is connected to one end of the fourth conductor 2172, the other end of the fourth signal conducting portion 2162 is connected to one end the sixth conductor 2182, and the other end of the fourth conductor 2172 is connected to the other end of the second ground conducting portion 2163. The other end of the fifth conductor 2181 is connected to the first signal conducting portion 2131 at or near where the first signal conducting portion 2131 is connected to one end of the capacitor 2150, and the other end of the sixth conductor 2182 is connected to the second signal conducting portion 2132 at or near where the second signal conducting portion 2132 is connected to the other end of the capacitor 2150. Thus, the fifth conductor 2181 and the sixth conductor 2182 are connected in parallel to both ends of the capacitor 2150. The fifth conductor 2181 and the sixth conductor 2182 are used as an input port to receive an RF signal as an input.

Accordingly, the third signal conducting portion 2161, the fourth signal conducting portion 2162, the second ground conducting portion 2163, the third conductor 2171, the fourth conductor 2172, the fifth conductor 2181, the sixth conductor 2182, and the resonator 2110 are connected to each other, causing the resonator 2110 and the feeding unit 2120 to have an electrically closed loop structure. The term "loop structure" includes a polygonal structure, a circular structure, a rectangular structure, and any other geometrical structure that is closed, i.e., that does not have any opening in its perimeter. The expression "having a loop structure" indicates a structure that is electrically closed.

If an RF signal is input to the fifth conductor 2181 or the sixth conductor 2182, input current flows through the feeding unit 2120 and the resonator 2110, generating a magnetic field that induces a current in the resonator 2110. A direction of the input current flowing through the feeding unit 2120 is identical to a direction of the induced current flowing through the resonator 2110, thereby causing a strength of a total magnetic field to increase in the center of the resonator 2110, and decrease near the outer periphery of the resonator 2110.

An input impedance is determined by an area of a region between the resonator 2110 and the feeding unit 2120. Accordingly, a separate matching network used to match the input impedance to an output impedance of a power amplifier may not be necessary. However, if a matching network is used, the input impedance may be adjusted by adjusting a size of the feeding unit 2120, and accordingly a structure of the matching network may be simplified. The simplified structure of the matching network may reduce a matching loss of the matching network.

The second transmission line, the third conductor 2171, the fourth conductor 2172, the fifth conductor 2181, and the sixth conductor 2182 of the feeding unit may have a structure identical to the structure of the resonator 2110. For example, if the resonator 2110 has a loop structure, the feeding unit 2120 may also have a loop structure. As another example, if the resonator 2110 has a circular structure, the feeding unit 2120 may also have a circular structure.

Figure 22A:
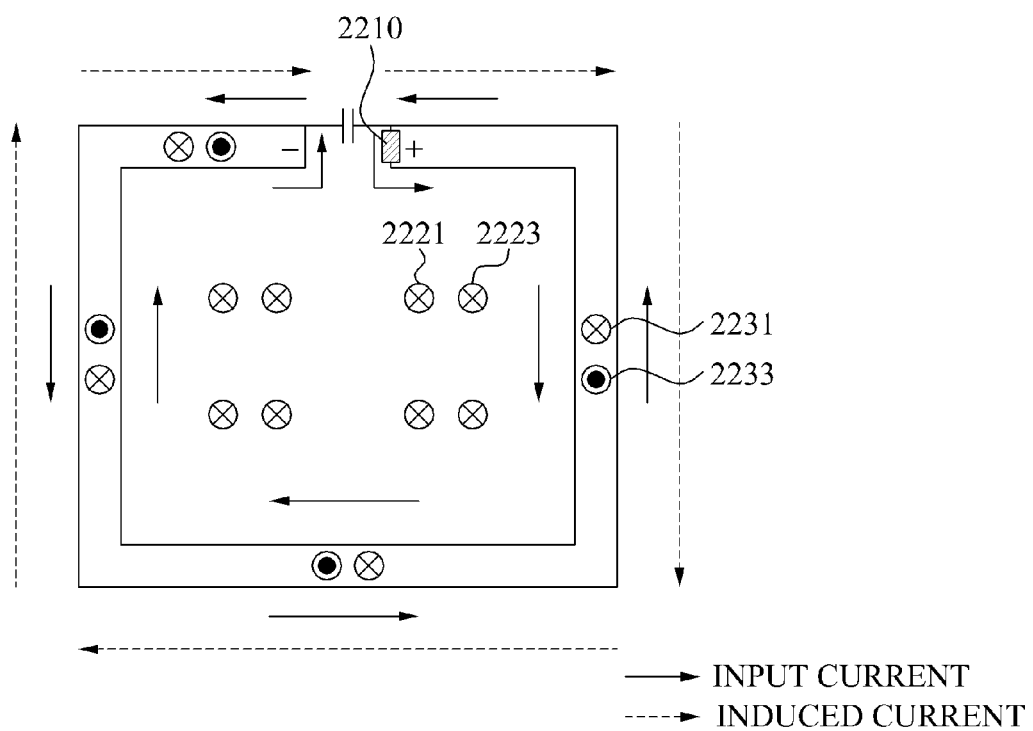
FIG. 22A is a diagram illustrating an example of a distribution of a magnetic field in a resonator that is produced by feeding of a feeding unit, of a wireless power transmitter.

FIG. 22A is a diagram illustrating an example of a distribution of a magnetic field in a resonator that is produced by feeding of a feeding unit, of a wireless power transmitter. FIG. 22A more simply illustrates the resonator 2110 and the feeding unit 2120 of FIGS. 21A and 21B, and the names of the various elements in FIG. 21B will be used in the following description of FIG. 22A without reference numerals.

A feeding operation may be an operation of supplying power to a source resonator in wireless power transmission, or an operation of supplying AC power to a rectification unit in wireless power transmission. FIG. 22A illustrates a direction of input current flowing in the feeding unit, and a direction of induced current flowing in the source resonator. Additionally, FIG. 22A illustrates a direction of a magnetic field formed by the input current of the feeding unit, and a direction of a magnetic field formed by the induced current of the source resonator.

Referring to FIG. 22A, the fifth conductor or the sixth conductor of the feeding unit 2120 may be used as an input port 2210. In FIG. 22A, the sixth conductor of the feeding unit is being used as the input port 2210. An RF signal is input to the input port 2210. The RF signal may be output from a power amplifier. The power amplifier may increase and decrease an amplitude of the RF signal based on a power requirement of a target device. The RF signal input to the input port 2210 is represented in FIG. 22A as an input current flowing in the feeding unit. The input current flows in a clockwise direction in the feeding unit along the second transmission line of the feeding unit. The fifth conductor and the sixth conductor of the feeding unit are electrically connected to the resonator. More specifically, the fifth conductor of the feeding unit is connected to the first signal conducting portion of the resonator, and the sixth conductor of the feeding unit is connected to the second signal conducting portion of the resonator. Accordingly, the input current flows in both the resonator and the feeding unit. The input current flows in a counterclockwise direction in the resonator along the first transmission line of the resonator. The input current flowing in the resonator generates a magnetic field, and the magnetic field induces a current in the resonator due to the magnetic field. The induced current flows in a clockwise direction in the resonator along the first transmission line of the resonator. The induced current in the resonator transfers energy to the capacitor of the resonator, and also generates a magnetic field. In FIG. 22A, the input current flowing in the feeding unit and the resonator is indicated by solid lines with arrowheads, and the induced current flowing in the resonator is indicated by dashed lines with arrowheads.

A direction of a magnetic field generated by a current is determined based on the right-hand rule. As illustrated in FIG. 22A, within the feeding unit, a direction 2221 of the magnetic field generated by the input current flowing in the feeding unit is identical to a direction 2223 of the magnetic field generated by the induced current flowing in the resonator. Accordingly, a strength of the total magnetic field may increases inside the feeding unit.

In contrast, as illustrated in FIG. 22A, in a region between the feeding unit and the resonator, a direction 2233 of the magnetic field generated by the input current flowing in the feeding unit is opposite to a direction 2231 of the magnetic field generated by the induced current flowing in the resonator. Accordingly, the strength of the total magnetic field decreases in the region between the feeding unit and the resonator.

Typically, in a resonator having a loop structure, a strength of a magnetic field decreases in the center of the resonator, and increases near an outer periphery of the resonator. However, referring to FIG. 22A, since the feeding unit is electrically connected to both ends of the capacitor of the resonator, the direction of the induced current in the resonator is identical to the direction of the input current in the feeding unit. Since the direction of the induced current in the resonator is identical to the direction of the input current in the feeding unit, the strength of the total magnetic field increases inside the feeding unit, and decreases outside the feeding unit. As a result, due to the feeding unit, the strength of the total magnetic field increases in the center of the resonator having the loop structure, and decreases near an outer periphery of the resonator, thereby compensating for the normal characteristic of the resonator having the loop structure in which the strength of the magnetic field decreases in the center of the resonator, and increases near the outer periphery of the resonator. Thus, the strength of the total magnetic field may be constant inside the resonator.

A power transmission efficiency for transferring wireless power from a source resonator to a target resonator is proportional to the strength of the total magnetic field generated in the source resonator. Accordingly, when the strength of the total magnetic field increases inside the source resonator, the power transmission efficiency also increases.

Figure 22B:
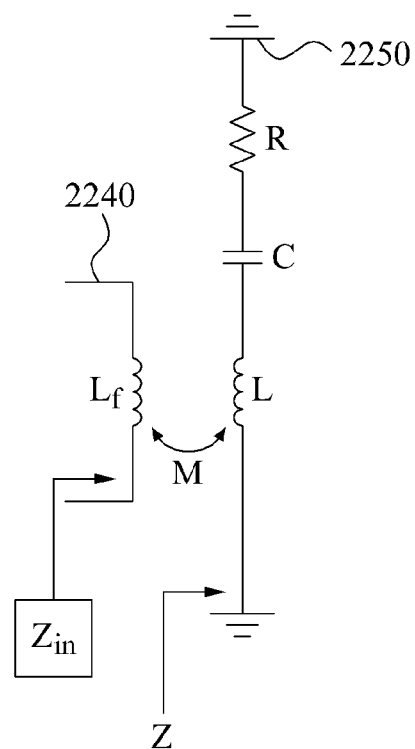
FIG. 22B is a diagram illustrating examples of equivalent circuits of a feeding unit and a resonator of a wireless power transmitter.

FIG. 22B is a diagram illustrating examples of equivalent circuits of a feeding unit and a resonator of a wireless power transmitter. Referring to FIG. 22B, a feeding unit 2240 and a resonator 2250 may be represented by the equivalent circuits in FIG. 22B. The feeding unit 2240 is represented as an inductor having an inductance $L_f$, and the resonator 2250 is represented as a series connection of an inductor having an inductance L coupled to the inductance $L_f$ of the feeding unit 2240 by a mutual inductance M, a capacitor having a capacitance C, and a resistor having a resistance R. An example of an input impedance $Z_{in}$ viewed in a direction from the feeding unit 2240 to the resonator 2250 may be expressed by the following Equation 1:

$$Z_{in} = \frac{(\omega M)^2}{Z} \qquad (1)$$

In Equation 1, M denotes a mutual inductance between the feeding unit 2240 and the resonator 2250, ω denotes a resonance frequency of the feeding unit 2240 and the resonator 2250, and Z denotes an impedance viewed in a direction from the resonator 2250 to a target device. As can be seen from Equation 1, the input impedance $Z_{in}$ is proportional to the square of the mutual inductance M. Accordingly, the input impedance $Z_{in}$ may be adjusted by adjusting the mutual inductance M. The mutual inductance M depends on an area of a region between the feeding unit 2240 and the resonator 2250. The area of the region between the feeding unit 2240 and the resonator 2250 may be adjusted by adjusting a size of the feeding unit 2240, thereby adjusting the mutual inductance M and the input impedance $Z_{in}$. Since the input impedance $Z_{in}$ may be adjusted by adjusting the size of the feeding unit 2240, it may be unnecessary to use a separate matching network to perform impedance matching with an output impedance of a power amplifier.

In a target resonator and a feeding unit included in a wireless power receiver, a magnetic field may be distributed as illustrated in FIG. 22A. For example, the target resonator may receive wireless power from a source resonator via magnetic coupling. The received wireless power induces a current in the target resonator. The induced current in the target resonator generates a magnetic field, which induces a current in the feeding unit. If the target resonator is connected to the feeding unit as illustrated in FIG. 22A, a direction of the induced current flowing in the target resonator will be identical to a direction of the induced current flowing in the feeding unit. Accordingly, for the reasons discussed above in connection with FIG. 22A, a strength of the total magnetic field will increase inside the feeding unit, and will decrease in a region between the feeding unit and the target resonator.

Figure 23:
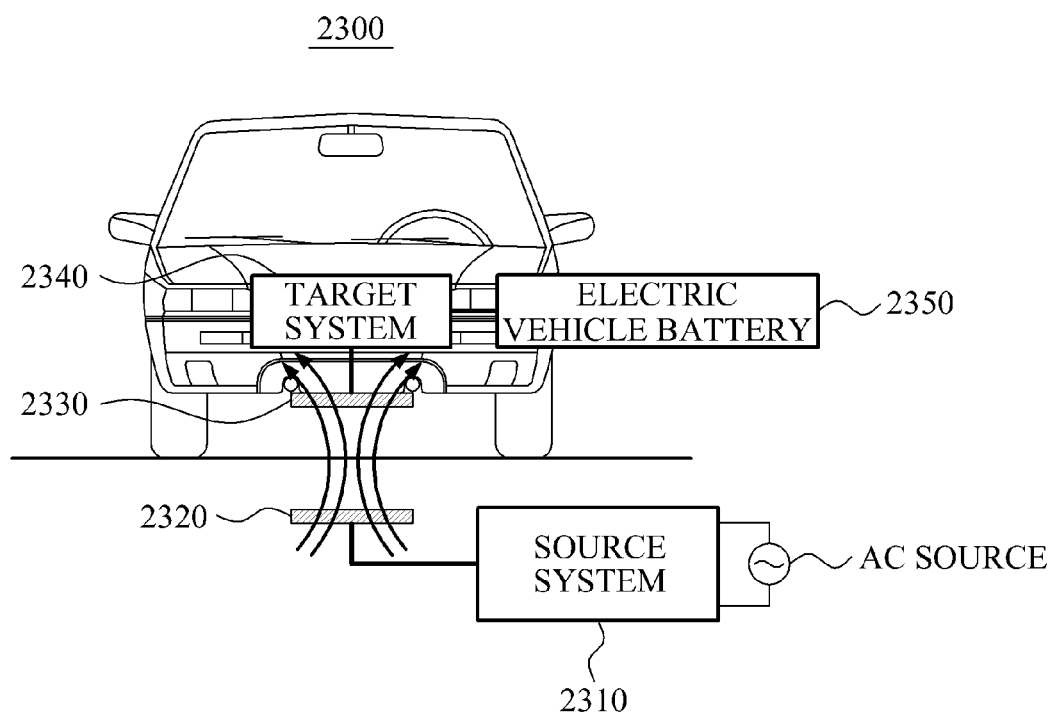
FIG. 23 is a diagram illustrating an example of an electric vehicle charging system.

FIG. 23 is a diagram illustrating an example of an electric vehicle charging system. Referring to FIG. 23, an electric vehicle charging system 2300 includes a source system 2310, a source resonator 2320, a target resonator 2330, a target system 2340, and an electric vehicle battery 2350.

In one example, the electric vehicle charging system 2300 has a structure similar to the structure of the wireless power transmission system of FIG. 1. The source system 2310 and the source resonator 2320 in the electric vehicle charging system 2300 operate as a source. The target resonator 2330 and the target system 2340 in the electric vehicle charging system 2300 operate as a target.

In one example, the source system 2310 includes an alternating current-to-direct current (AC/DC) converter, a power detector, a power converter, a control and communication (control/communication) unit similar to those of the source device 110 of FIG. 1. In one example, the target system 2340 includes a rectifier, a DC-to-DC (DC/DC) converter, a switch unit, a charging unit, and a control/communication unit similar to those of the target device 120 of FIG. 1. The electric vehicle battery 2350 is charged by the target system 2340. The electric vehicle charging system 2300 may use a resonant frequency in a band of a few kHz to tens of MHz.

The source system 2310 generates power based on a type of the vehicle being charged, a capacity of the electric vehicle battery 2350, and a charging state of the electric vehicle battery 2350, and wirelessly transmits the generated power to the target system 2340 via a magnetic coupling between the source resonator 2320 and the target resonator 2330.

The source system 2310 may control an alignment of the source resonator 2320 and the target resonator 2330. For example, when the source resonator 2320 and the target resonator 2330 are not aligned, the controller of the source system 2310 may transmit a message to the target system 2340 to control the alignment of the source resonator 2320 and the target resonator 2330.

For example, when the target resonator 2330 is not located in a position enabling maximum magnetic coupling, the source resonator 2320 and the target resonator 2330 are not properly aligned. When a vehicle does not stop at a proper position to accurately align the source resonator 2320 and the target resonator 2330, the source system 2310 may instruct a position of the vehicle to be adjusted to control the source resonator 2320 and the target resonator 2330 to be aligned. However, this is just an example, and other methods of aligning the source resonator 2320 and the target resonator 2330 may be used.

The source system 2310 and the target system 2340 may transmit or receive an ID of a vehicle and exchange various messages by performing communication with each other.

The descriptions of FIGS. 2 through 22B are also applicable to the electric vehicle charging system 2300. However, the electric vehicle charging system 2300 may use a resonant frequency in a band of a few kHz to tens of MHz, and may wirelessly transmit power that is equal to or higher than tens of watts to charge the electric vehicle battery 2350.

The units described herein may be implemented using hardware components, software components, or a combination thereof. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, that independently or collectively instructs or configures the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable recording mediums.

The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments that accomplishes the examples disclosed herein can be easily construed by programmers skilled in the art to which the examples pertain based on and using the flow diagrams and block diagrams of the figures and their corresponding descriptions as provided herein.

As a non-exhaustive illustration only, a device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless power receiver comprising:
a receiving unit configured to wirelessly receive a power;
a controller configured to control a length of a clock signal based on the power; and
a modulator configured to change an impedance based on the length of the clock signal to perform load modulation.

2. The wireless power receiver of claim 1, further comprising:
a voltage measuring unit configured to measure a voltage applied to a load based on the power,
wherein the controller comprises
a comparing unit configured to compare the voltage applied to the load with a reference voltage, and output a high signal or a low signal based on the comparison, and
a control signal output unit configured to continuously output clock signals to the modulator if the control signal output unit receives the high signal, and output the clock signals to the modulator during a predetermined period if the control signal output unit receives the low signal, a number of the outputted clock signals being predetermined between the wireless power receiver and a wireless power transmitter, and wherein the modulator is further configured to change the impedance based on the clock signals.

3. The wireless power receiver of claim 2, wherein the reference voltage comprises a voltage measured when the load is completely-charged.

4. The wireless power receiver of claim 2, wherein the control signal output unit comprises:
- a first clock generator configured to generate another clock signal during the predetermined period;
- a second clock generator configured to continuously generate the clock signals of a predetermined frequency;
- a bit counter configured to count, using bits, the clock signals, and output the counted clock signals, if the bit counter receives the other clock signal, a number of the counted clock signals being predetermined between the wireless power receiver and the wireless power transmitter; and
- a multiplexer (MUX) configured to continuously output the clock signals to the modulator if the MUX receives the high signal, and output the counted clock signals if the MUX receives the low signal.

5. The wireless power receiver of claim 1, wherein:
the modulator comprises a transistor comprising a gate; and
the modulator is further configured to apply the length of the clock signal to the gate to change the impedance of the wireless power receiver.

6. The wireless power receiver of claim 1, further comprising:
- a rectifier configured to rectify the power to a direct current (DC) signal;
- a DC-to-DC (DC/DC) converter configured to convert the DC signal to a voltage applied to a load; and
- a voltage measuring unit configured to measure the voltage applied to the load,
wherein the controller is further configured to control the length of the clock signal based on the measured voltage.

7. The wireless power receiver of claim 1, wherein the controller is further configured to:
receive a ping signal from a wireless power transmitter, the ping signal comprising a minimum power needed to operate the controller.

8. The wireless power receiver of claim 1, wherein the length of the clock signal comprises a length of a time in which the clock signal of a predetermined frequency is maintained.

9. A wireless power reception method comprising:
wirelessly receiving a power;
controlling a length of a clock signal based on the power; and
changing an impedance based on the length of the clock signal to perform load modulation.

10. The wireless power reception method of claim 9, further comprising:
measuring a voltage applied to a load based on the power;
comparing the voltage applied to the load with a reference voltage;
outputting a high signal or a low signal based on the comparison;
continuously outputting clock signals if the high signal is output;
outputting the clock signals during a predetermined period if the low signal is output, a number of the outputted clock signals being predetermined; and
changing the impedance based on the clock signals.

11. The wireless power reception method of claim 10, further comprising:
generating another clock signal during the predetermined period;
continuously generating the clock signals of a predetermined frequency;
counting, using bits, the clock signals, and outputting the counted clock signals, if the other clock signal is generated, a number of the counted clock signals being predetermined; and
outputting the counted clock signals if the low signal is output.

* * * * *